United States Patent
Kern

(10) Patent No.: US 12,540,788 B2
(45) Date of Patent: Feb. 3, 2026

(54) SIMULATION DEPLOYMENT UNIT FOR A CONDUCTED ELECTRICAL WEAPON

(71) Applicant: Axon Enterprise, Inc., Scottsdale, AZ (US)

(72) Inventor: Lynn Kern, Phoenix, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 310 days.

(21) Appl. No.: 18/269,460

(22) PCT Filed: Dec. 23, 2021

(86) PCT No.: PCT/US2021/065158
§ 371 (c)(1),
(2) Date: Jun. 23, 2023

(87) PCT Pub. No.: WO2022/182414
PCT Pub. Date: Sep. 1, 2022

(65) Prior Publication Data
US 2024/0060743 A1 Feb. 22, 2024

Related U.S. Application Data

(60) Provisional application No. 63/130,510, filed on Dec. 24, 2020.

(51) Int. Cl.
*F41A 33/06* (2006.01)
*F41H 13/00* (2006.01)

(52) U.S. Cl.
CPC .......... *F41A 33/06* (2013.01); *F41H 13/0012* (2013.01)

(58) Field of Classification Search
CPC .. F41H 13/00; F41H 13/0012; F41H 13/0025; F41H 13/0043; F41H 13/0093;
(Continued)

(56) References Cited

U.S. PATENT DOCUMENTS 8,602,784 B2   12/2013   Dvorak
9,228,808 B2   1/2016    Brundula et al.
(Continued)

FOREIGN PATENT DOCUMENTS

EP   3608621 A1   2/2020
WO   2020008307 A1   1/2020

OTHER PUBLICATIONS

Meggitt Training Systems, Accessories, 2019, 2 pages, Suwanee, GA, MeggittTrainingSystems.com.
(Continued)

*Primary Examiner* — Milap Shah
(74) *Attorney, Agent, or Firm* — Andrew Terajewicz; Andrew Graham

(57) ABSTRACT

A conducted electrical weapon ("CEW") may comprise a handle and a deployment unit. A CEW may be adapted for use in a simulation system comprising a simulator and a display. A simulation deployment unit may be used with a handle to adapt the CEW for use in the simulation system. The simulation deployment unit may be configured to detect motion data corresponding with at least one of a change in position, a change in orientation, and an initial orientation of the CEW. The simulation deployment unit may be configured to pass the motion data to the handle so the motion data may be transmitted to a simulator via a communication circuit of the handle. The simulation deployment unit may require power from the handle to operate, and the handle may require motion data provided by the simulation deployment unit so that the CEW may be used in the simulation system.

20 Claims, 5 Drawing Sheets

(58) Field of Classification Search
CPC ........... G09B 9/00; G09B 9/003; F41A 33/00; F41A 33/06
See application file for complete search history.

(56) References Cited

U.S. PATENT DOCUMENTS

| | | | |
|---|---|---|---|
| 10,663,259 B2 | 5/2020 | Allgaier | |
| 2007/0070574 A1* | 3/2007 | Nerheim | F41H 13/0025 361/232 |
| 2013/0071815 A1* | 3/2013 | Hudson | F41G 3/2655 434/19 |
| 2014/0045146 A1* | 2/2014 | Otte | F41G 3/2627 434/21 |
| 2014/0065577 A1* | 3/2014 | Quinlan | F41A 33/06 434/18 |
| 2016/0117945 A1* | 4/2016 | Otte | G09B 5/02 434/22 |
| 2017/0372632 A1* | 12/2017 | Baker | G09B 5/065 |
| 2018/0045494 A1* | 2/2018 | Heroor | F41H 13/0025 |
| 2018/0140945 A1* | 5/2018 | Grant | A63F 13/837 |
| 2020/0109926 A1* | 4/2020 | Mata | G01P 15/18 |
| 2020/0284556 A1* | 9/2020 | Nemtyshkin | F41H 13/0025 |
| 2021/0018292 A1* | 1/2021 | Formwalt | F41A 9/61 |
| 2021/0364256 A1* | 11/2021 | Pirc | F41H 13/0025 |

OTHER PUBLICATIONS

Korean Intellectual Property Office, International Search Report for International Application No. PCT/US21/65158, mailed Oct. 25, 2022.

* cited by examiner

SIMULATION DEPLOYMENT UNIT FOR A CONDUCTED ELECTRICAL WEAPON

FIELD OF THE INVENTION

Embodiments of the present invention relate to a simulation deployment unit for use in a conducted electrical weapon ("CEW").

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figures 1A, 1B:
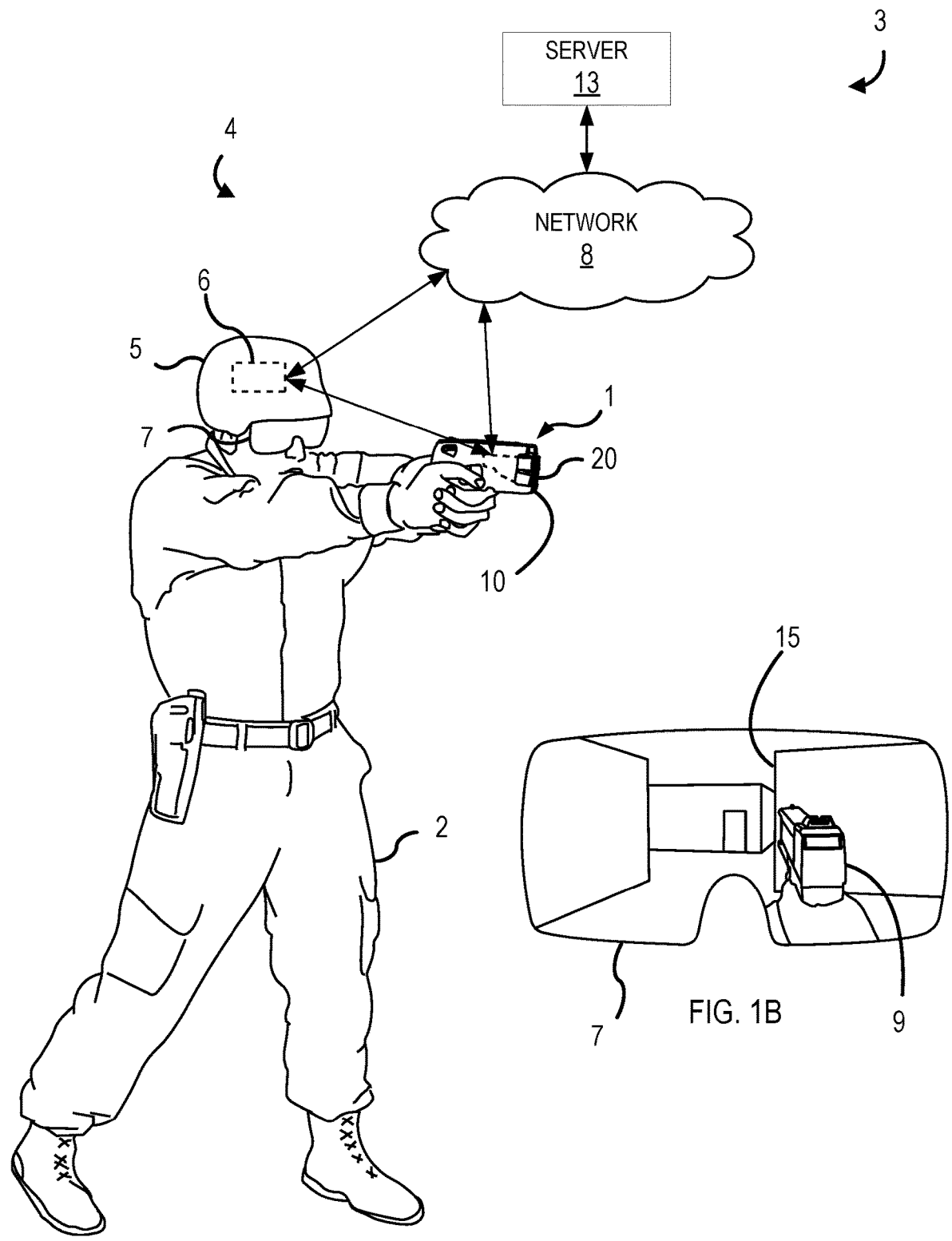
FIG. 1A illustrates a simulation system, in accordance with various embodiments described herein.
FIG. 1B illustrates a display of a simulator, in accordance with various embodiments described herein.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

Enforcement personnel (e.g., law enforcement officers, police officers, border patrol officers, security guards, etc.) are issued weaponry such as lethal weapons (e.g., firearms, guns, handguns, etc.) and less lethal weapons (e.g., conducted electrical weapons, CEWs, etc.) in order to perform their duties. Enforcement personnel are required to practice with weaponry in order to improve situational awareness, decision making and problem-solving skills, stress management, and safe and effective use of the weaponry in varying situations. Preferably, training is performed on weaponry as similar as possible to the equipment enforcement personnel use in the field.

Training with weaponry may require the use of live ammunition and/or training ammunition. Live ammunition may include consumable cartridges for non-training usage (e.g., live deployment units) and training ammunition may include consumable cartridges (e.g., training deployment units) for training usage. For example, training ammunition may comprise frangible, marking, and/or rubber projectile ammunition. A consumable cartridge may contain a projectile, propellant, primer, and casing.

Simulation-based training provides a means for enforcement personnel to repeatably practice with weaponry in a variety of situations without the need for using live ammunition and/or consumable cartridges. Simulation based training may use simulation cartridges (e.g., simulation deployment units) and simulated environments to advance the degree of environmental and psychological fidelity available in training. Simulated environments may include augmented reality (AR) environments and virtual reality (VR) environments. Simulated environments may include mixed reality (MR) environments and extended reality (XR) environments.

An augmented reality (AR) environment may refer to a user's perception of a real, physical environment with the addition of generated virtual, two- or three-dimensional objects in the real environment. Virtual objects may be perceived to exist in the real space as if they were real objects, with the ability of users to move around the virtual objects, see the virtual objects from different angles, and interact with the virtual objects, as appropriate. In some embodiments, the real environment may comprise a local environment in which the simulation-based training is being provided.

A virtual reality (VR) environment may include a wholly generated virtual environment which may include images, sounds, and other sensations intended to replicate a real or imaginary environment. A virtual environment may simulate a user's physical presence in the virtual environment and enable the user to interact with the virtual space. Virtual environments may be implemented to provide an infinite number of environments and training scenarios.

Establishing an augmented reality environment within a real space may include projecting computer generated virtual objects into the space, where the virtual objects behave as if they are physically in the space. For example, the virtual object may be projected into an image of a real environment displayed via a head-mounted display. An augmented reality simulation system may generate an image that represents both the virtual object and the real environment. In an augmented reality environment, one or more users may be able to see each other (i.e., actual or virtual representations of each other) and the virtual objects, and interact with the virtual objects and each other.

Virtual reality environments may be established independent of the space, and include an entirely virtual space and virtual objects. Virtual representation of one or more users may interact with each other and with the virtual space and virtual objects therein. In a virtual reality system, an entirely virtual image may be simulated for display to a user, and in an augmented reality system, a simulated image may be overlaid or otherwise incorporated with an actual image for display to the user. In other types of extended reality environments, such as mixed reality environments, a combination of a real-world environment and a generated environment may be visible via a head-mounted display of a simulation system.

A real-world experience may be simulated using an immersive virtual reality or augmented reality. Simulations of real-world experiences may offer enforcement personnel vital training in responding to various scenarios they may encounter in their jobs. Simulations may present multiple decision-making steps, allowing the user to rapidly iterate and learn from the outcomes of each of their choices.

A simulation system may provide feedback (e.g., immediate feedback and/or delayed feedback) based on the user's selections and actions during the simulation. The feedback may include virtual representations of non-player characters (NPCs) during the simulation, and/or a generated summary at the end of the simulation. The simulation system may also compute and provide various metrics and statistics of performance. Additionally, or alternatively, the feedback may include visual, audible, or haptic signals during the simulation and/or at the end of the simulation.

A simulation system may provide a platform on which enforcement personnel may experience and train in various scenarios. The simulation system may compute and display a visual virtual or augmented reality model of an environment, and in accordance with the user's gestures, actions, and/or interactions with weaponry, may provide feedback, such as visual, audible, or haptic signals.

A simulation system may include a simulator, a display, and simulation weaponry. The simulation weaponry may be configured to be virtually projected as virtual weaponry in a simulated environment that is generated by the simulator and projected on the display. The display may include an augmented reality display device that allows virtual objects to be represented in a real space, or a virtual reality display device that visually immerses a user in an entirely generated virtual environment. The simulator may be configured to receive inputs from simulation weaponry to track virtual weaponry corresponding with the simulation weaponry in a simulated environment.

Simulation weaponry may include real weaponry adapted to be used in a simulation system. Simulation weaponry may be configured to provide visual, audible, or haptic inputs to a simulator. Simulation weaponry may be displayed as virtual weaponry in a simulated environment. A user's interactions with simulation weaponry in real space may correspond with the user's interactions with virtual weaponry in a simulated environment. At least one of a change in position, a change in orientation, an initial orientation, or an operation of the simulation weaponry in a real environment may correspond with at least one of a change in position, a change in orientation, an initial orientation, or an operation of the virtual weaponry in the simulated environment.

In various embodiments, and with reference to FIG. 1A, a simulation system 3 is disclosed. Simulation system 3 may be similar to, or have similar aspects and/or components with, the simulation systems previously discussed herein. It should be understood by one skilled in the art that FIG. 1A is a schematic representation of simulation system 3, and one or more of the components of simulation system 3 may be located in one or more suitable positions within, or external to simulation system 3. Simulation system 3 may comprise a conducted electrical weapon 1 and a simulator 4.

In various embodiments, conducted electrical weapon 1 may be adapted to be used in a simulation system. A conducted electrical weapon (e.g., "CEW," conducted energy weapon, conductive electrical weapon, etc.) may be used to deliver a current (e.g., stimulus signal, pulses of current, pulses of charge, etc.) through tissue of a human or animal target. The stimulus signal carries a charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion by the target.

In various embodiments, CEW 1 may include a handle 10 a simulation deployment unit (e.g., simulation cartridge, simulation magazine, etc.) 20. Handle 10 may include one or more bays for receiving a simulation deployment unit 20. Simulation deployment unit 20 may be removably positioned in (e.g., inserted into, coupled to, etc.) a bay of handle 10. Simulation deployment unit 20 may releasably electrically, electronically, and/or mechanically couple to a bay of handle 10. Engagement of simulation deployment unit 20 with handle 10 may be configured to adapt CEW 1 for use in simulation system 3.

In various embodiments, CEW 1 may be configured to transmit an input signal corresponding with at least one of motion (e.g., change in orientation and/or change in position), or operation of CEW 1 to simulator 4. A simulator may comprise one or more devices configured to provide (e.g., display) a simulated environment to a user. The simulator may be configured to receive an input signal. The input signal may be received while the simulated environment is displayed. The input signal may be received from another device communicatively coupled to the simulator. A simulator may be separate the other device of simulation system by which an input signal is provided. For example, simulator 4 may perform operations on the input signal from another device comprising CEW 1 and provide an output signal to a display to project virtual weaponry in a simulated environment corresponding with CEW 1. In accordance with the input signal, a simulated environment provided by simulator 4 may be updated.

In various embodiments, simulator 4 may be configured to receive an input signal corresponding with at least one of a motion or an operation of CEW 1. Responsive to the input signal, simulator 4 may project a virtual weapon corresponding with the input signal on a display. Responsive to a sequence of received input signals, simulator 4 may update a simulated environment presented to a user. A revised image for presenting to a user may be generated responsive to each input signal received by simulator 4 to update the simulated environment. Simulator 4 may comprise a processing circuit, such as simulation processing circuit 6 and a display, such as display 7.

In various embodiments, simulation processing circuit 6 and/or display 7 may be integrated into a wearable unit, such as wearable unit 5. Wearable unit 5 may be configured to be worn by a user, such as user 2. Wearable unit 5 may be configured to be mounted to a head of a user. For example, wearable unit 5 may comprise a headset configured to be worn on the head of user 2 to position display 7 close to eyes of user 2. In some embodiments, simulation processing unit 6 and a display 7 of the wearable unit 5 may be integrated in a same housing mountable proximate eyes of a user.

In various embodiments, a display of a simulator may comprise a remote display configured to be separate from the user, such as a screen or monitor. The remote display may comprise a non-wearable display. For example, display 7 may include an augmented reality display or a virtual reality display. Display 7 may include a light emitting diode (LED) display, liquid crystal display (LCD), organic liquid crystal display (OLED), cathode ray tube (CRT) display, plasma display, quantum dot display, projection display, stereoscopic display, holographic display, head-mounted display, near-eye display or other display configured to display visual data to user 2.

In various embodiments, a processing circuit may comprise various circuitry, electrical components, electronic components, software, and/or the like configured to perform various operations and functions discussed herein. For example, simulation processing circuit 6 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or combinations thereof. In various embodiments, a processing circuit may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, a processing circuit may include data buses, output ports, input ports, timers, memory, arithmetic units, and/or the like.

In various embodiments, a simulator and/or a CEW (e.g., simulator 4, CEW 1, etc.) may comprise a memory configured to store data, instructions, programs, or the like. The memory may comprise a tangible non-transitory computer-readable memory. A processing circuit may comprise or be in communication with the memory. A processing circuit may communicate with the memory to access, retrieve, and/or transmit data, instructions, and/or programs to the memory. Instructions stored on the tangible non-transitory memory may allow a processing circuit to perform various operations, functions, and/or steps, as described herein. For example, in response to simulation processing circuit 6 executing the instructions on the tangible non-transitory memory, simulation processing circuit 6 may communicate with display 7 to display a generated virtual object corresponding with CEW 1 as discussed herein.

A processing circuit may be configured to provide and/or receive electrical signals whether digital and/or analog in form. A processing circuit may provide and/or receive digital information via a data bus using a protocol. A processing circuit may receive information, manipulate the received information, and provide the manipulated information. A processing circuit may store information and retrieve stored information. Information received, stored, and/or manipulated by a processing circuit may be used to perform a function, control a function, and/or to perform an operation or execute a stored program.

A processing circuit may control the operation and/or function of other circuits and/or components. A processing circuit may receive status information regarding the operation of other components, perform calculations with respect to the status information, and provide commands (e.g., instructions) to one or more other components. A processing circuit may command another component to start operation, continue operation, alter operation, suspend operation, cease operation, or the like. Commands and/or status may be communicated between a processing circuit and other circuits and/or components via a bus (e.g., SPI bus). The bus, according to various aspects of the present disclosure may comprise one or more of a data bus and/or an address bus.

In various embodiments, simulation processing circuit 6 may be configured to translate an input signal provided by CEW 1 into output data to be projected on display 7. Simulation processing circuit 6 may manipulate (e.g., transform, convert, interpret, etc.) the received input signal and provide the manipulated input signal as output data to display 7. For example, simulation processing circuit 6 may generate an image of CEW 1 for display via display. The image may comprise a virtual object representing CEW 1 (e.g., a virtual CEW, such as virtual CEW 9). Responsive to an input signal, simulation processing circuit 6 may modify the image. For example, an orientation and/or position of the virtual CEW presented in the display may be altered in accordance with the input signal corresponding to the orientation and/or position of CEW 1 being altered. Alternately or additionally, an input signal representing an operation of CEW 1 may be received by simulation processing circuit 6. Responsive to the input signal, simulation processing circuit 6 may modify an image representing CEW 1 to represent the operation to a user via display 7. For example, an actuation of a safety switch of CEW 1 to an armed position may be used to update virtual CEW 9 in an image presented via display 7 such that a safety switch of virtual CEW 9 in the image is depicted as also being disposed in an armed position.

In various embodiments, simulator 4 may comprise a server, such as server 13 configured to aid in manipulating the input signal into output data to be displayed by display 7. Server 13 may perform similar functions as a processor. For example, server 13 may perform similar operations to those performed by simulation processing circuit 6. Server 13 may be in wireless communication with simulation processing circuit 6 via a network, such as network 8. Network 8 may comprise a wireless communication network using one or more wireless communication protocols, such as Wi-Fi, 2G, 3G, 4G, 5G, LTE, WiMAX, BLUETOOTH, and the like. Alternately or additionally, network 8 may comprise a wired communication network or a combination of wired and wireless communication networks.

In various embodiments, an input signal may be uploaded to server 13. Various methods may be used to upload an input signal from a CEW to a server. In an implementation, a CEW may upload an input signal to a server via a wireless connection to a network. For example, CEW 1 may wirelessly transmit an input signal to server 13 via network 8. In another implementation, CEW 1 may transmit an input signal to server 13 via a wired connection to network 8. In some embodiments, the input signal may be transmitted from CEW 1 to simulator 4. Simulator 4 may further relay the input signal to server 13 for further processing.

A server may store an input signal. A server may analyze the input signal provided by a CEW. A server may analyze the input signal from one or more simulation weapons to determine one or more of a change in position, a change in orientation, an initial orientation, and an operation of the one or more simulation weapons. A server may be configured to generate a virtual weapon in a virtual environment, wherein movement and/or operation of the virtual weapon corresponds with movement and/or operation of a simulation weapon.

A server may generate a virtual environment, virtual objects, or a combination of a virtual environment and virtual objects. The generated virtual environment and/or virtual objects may be projected on a display. At least one of a change in position, change in orientation, initial orientation, or operation of a virtual object may correspond with a real object.

For example, and with reference to FIGS. 1A-1B, server 13 may receive an input signal from CEW 1. CEW 1 may transmit the input signal to server 13. The signal may be received (e.g., relayed) via simulator 4 or, in the alternative, received directly over network 8. Server 13 may analyze the input signal from CEW 1. Server 13 may analyze the input signal to determine (e.g., detect, identify, etc.) at least one of a change in position, change in orientation, initial orientation, or operation of a real object, such as CEW 1. Server 13 may analyze the input signal to determine at least one of a change in position, change in orientation, initial orientation, or operation of a virtual object, such as virtual CEW 9. The at least one of the change in position, change in orientation, initial orientation and operation of the virtual object may be generated in accordance with the identified change in position, change in orientation, initial orientation, and/or operation of the real object. Server 13 may analyze the input signal to determine at least one of change in position, change in orientation, initial orientation, or operation of virtual CEW 9 relative to a generated virtual environment, such as virtual environment 15. For example, server 13 may detect an interaction between virtual CEW 9 and a virtual object in virtual environment 15. Server 13 may project virtual CEW 9 and/or virtual environment 15 on a display, such as display 7. Server 13 may project virtual CEW 9 on an augmented reality display. Server 13 may project virtual CEW 9 and virtual environment 15 on a virtual reality display.

In various embodiments, operations to provide a simulation environment may alternately or additionally be performed by one or more local components of a simulation system. For example, CEW 1 may transmit an input signal to simulation processing circuit 6. Simulation processing circuit 6 may receive an input signal from CEW 1. CEW 1 may transmit an input signal to simulation processing circuit 6. Simulation processing circuit 6 may analyze the input signal from CEW 1. Simulation processing circuit 6 may analyze the input signal to determine (e.g., detect, identify, etc.) at least one of a change in position, change in orientation, initial orientation, or operation of a virtual object, such as virtual CEW 9. Simulation processing circuit 6 may analyze the input signal to determine at least one of a change in position, change in orientation, initial orientation, or operation of a virtual object, such as virtual CEW 9. The at least one of the change in position, change in orientation, initial orientation or operation of the virtual object may be generated in accordance with the identified change in position, change in orientation, initial orientation, and/or operation of the real object. Simulation processing circuit 6 may analyze the input signal to determine at least one of a change in position, change in orientation, initial orientation, or operation of virtual CEW 9 relative to a generated virtual environment, such as virtual environment 15. Simulation processing circuit 6 may project virtual CEW 9 and/or virtual environment 15 on a display, such as display 7. For example, simulation processing circuit 6 may detect an interaction between virtual CEW 9 and a virtual object in virtual environment 15. Simulation processing circuit 6 may project virtual CEW 9 on an augmented reality display. Simulation processing circuit 6 may project virtual CEW 9 and virtual environment 15 on a virtual reality display.

In various embodiments, a simulation deployment unit, such as simulation deployment unit 20 may be configured to adapt a CEW for use in simulation system 3. A simulation deployment unit may be configured to cooperate with a handle to adapt the handle for use in a simulated environment (e.g., virtual environment 15). A simulation deployment unit may include components that a live deployment may not include. For example, simulation deployment unit may include a motion detector sensor. A simulation deployment unit may exclude components that a live deployment may not exclude. For example, simulation deployment unit 20 may exclude an electrode deployable by a live deployment unit. In various embodiments, a simulation deployment unit may be configured to cause the CEW to transmit an input signal to simulator 4 (e.g., via simulation processing circuit 6 and/or server 13), such that a virtual CEW representing the CEW (e.g., virtual CEW 9) may be projected on a display.

In various embodiments, a CEW may be configured to detect motion data corresponding with motion (e.g., movement, etc.) of the CEW and provide the detected motion data as an input signal to simulation processing circuit 6 and/or server 13. Detecting motion data may include using one or more detectors (e.g., sensors) to determine whether the CEW is presently moving or has moved within a period of time. Movement may be detected along one or more axes. For example, one or more detectors may detect movement about an x-axis, a y-axis, and/or a z-axis of a Cartesian coordinate system. A change in the position and/or orientation of the CEW, or a portion thereof, from one coordinate in the coordinate system to another coordinate in the coordinate system may indicate movement of the CEW. Detectors may be used to detect movement in accordance with a coordinate system (e.g., polar, cylindrical, spherical, homogeneous, curvilinear, orthogonal, skew, log-polar, Plücker, Lagrangian, Hamiltonian, Barycentric, trilinear, etc.).

A detector may be used to detect movement of the CEW. Detectors (e.g., sensors) may include radar-based sensors, infrared sensors, microwave sensors, gyroscopes, ultrasonic detectors, acoustic sensors, optical sensors, vibration detectors, electromagnetic sensors, accelerometers, inertial measurement units (IMUs), and/or other device or component capable of detecting movement. In an implementation, an accelerometer and gyroscope are used to detect movement of the CEW.

A detector detects (e.g., measures, witnesses, discovers, monitors, etc.) a physical property (e.g., intensive, extensive, isotropic, anisotropic, etc.). A physical property may include a physical property such as, for example, acceleration, linear acceleration, angular velocity, a force of gravity, capacitance, electric charge, electric impedance, and electric potential. A detector may detect a quantity, a magnitude, and/or a change in a physical property. A detector may detect a physical property and/or a change in a physical property directly and/or indirectly. A detector may detect a physical property and/or a change in a physical property of an object. A detector may detect a physical quantity (e.g., extensive, intensive). A detector may detect a change in a physical quantity directly and/or indirectly. A physical quantity may include an amount of time, an elapse (e.g., lapse, expiration) of time, an electric current, an amount of electrical charge, a current density, an amount (e.g., magnitude) of capacitance, an amount of resistance, a magnitude (e.g., value) of a voltage and/or a current. A detector may detect one or more physical properties and/or physical quantities at the same time or at least partially at the same time.

A detector may transform a detected physical property from one physical property to another physical property (e.g., electrical to kinetic, kinetic to electrical, etc.). A detector may transform (e.g., mathematical transformation) a detected physical quantity. A detector may relate a detected physical property and/or physical quantity to another physical property and/or physical quantity. A detector may detect one physical property and/or physical quantity and deduce the existence of another physical property and/or physical quantity.

A detector may cooperate with a processing circuit, or may include an integrated processing circuit for detecting, transforming, relating, and/or deducing physical properties and/or physical quantities. A processing circuit may include a circuit for detecting, transforming, relating, and/or deducing physical properties and/or physical quantities. For example, a processing circuit may include a voltage sensor, a current sensor, a charge sensor, a light sensor, a heat sensor (e.g., thermometer), an electromagnetic signal sensor, and/or other suitable or desired sensor.

A detector may provide information (e.g., report). A detector may provide information regarding a physical property and/or a change in a physical property. A detector may provide information regarding a physical quantity (e.g., magnitude) and/or a change in a physical quantity. A detector may provide information to a processing circuit.

A motion detector may detect motion. A motion detector may detect linear motion (e.g., translation, a change in position, etc.). A motion detector may detect linear motion by measuring linear acceleration. A motion detector may detect angular motion (e.g., rotation, change in orientation, etc.). A motion detector may detect angular motion by measuring angular velocity. A motion detector may detect angular orientation. A motion detector may detect a physical quantity (e.g., heat, electricity, vibration, radio wave, electromagnetic wave, gravity, etc.) to detect motion. A motion detector may detect motion in one or more directions. A motion detector may detect and/or relate detection of motion, or the lack thereof, to a coordinate system.

A motion detector may provide motion data (e.g., data, signal, input data, information, etc.) responsive to detecting motion and/or to detecting a lack (e.g., absence) of motion. A motion detector may provide raw (e.g., unprocessed, without calculations) data to one or more components to perform one or more computations. A computation may include detecting motion or a lack of motion. A processing circuit may receive information from a motion detector. A processing circuit may perform computations to determine whether the motion detector has detected or not detected motion.

A motion detector may detect a force of gravity. A motion detector may use the force of gravity to detect movement of a CEW. A motion detector may use (e.g., factor in) or exclude (e.g., factor out) a force of gravity in the information reported by the detector. A motion detector may exclude the force of gravity to report movement related to movement of the CEW only.

A motion detector may measure a passage of time. A motion detector may provide information regarding detecting motion or the absence thereof for a period of time. A motion detector may cooperate with a processing circuit to measure a passage of time. Information provided by a motion detector may include data and/or a signal. Providing information may include providing a signal when a CEW does not move for a period of time. Providing information may include providing a signal each instance motion of a CEW is detected.

A processing circuit may receive information from one or more motion detectors. A processing circuit, as opposed to the motion detector, or in cooperation with the motion detector, may measure a passage of time. A processing circuit may use information provided by a motion detector to determine whether a CEW has moved or not moved during a period of time. A processing circuit may perform an operation in response to motion, or a lack of motion, of a CEW. A processing circuit may perform an operation in response to motion, or a lack of motion, detected during a period of time.

A processing circuit may use motion data provided by one or more motion detectors to determine at least one of a change in position, change in orientation, or initial orientation of a CEW. A processing circuit may use motion data related to linear acceleration or linear motion to detect a position, or change in position, of a CEW. A processing circuit may use motion data related to angular velocity or angular motion to detect an orientation (e.g., pitch, yaw, roll, etc.) or change in orientation of a CEW. A processing circuit may determine at least one of a change in position, a change in orientation, or an initial orientation in response to receiving motion data reported by a motion detector.

A processing circuit may perform sensor fusion on motion data from two or more motion detectors to improve estimation of position and orientation of a CEW. For example, a processor may combine first motion data provided by an accelerometer and magnetometer with second motion data provided by a gyroscope by applying a sensor fusion algorithm (e.g., a complementary filter, Kalman filter, Madgwick filter, Mahony filter, etc.). Applying sensor fusion algorithms may help to initialize orientation and correct for gyroscopic drift.

In embodiments, an orientation of a device may comprise a pose of the device. The orientation may comprise a direction to which the device is oriented in each of one or more planes of motion and/or a direction to which the device is oriented about one or more axes of motion. Orientation of the device may comprise a pitch, yaw, and/or roll of the object relative to respective axes of motion. The orientation may comprise a first set of three degrees of freedom of the device which may be modified via rotation of the device. An initial orientation of the device may comprise a first orientation of the device detected upon generation of motion data for the device. For example, an initial orientation may comprise a first direction in which the device is oriented about each of one or more axes of motion when a motion detector of the device is activated (e.g., powered on). The initial orientation may be indicated in motion data first generated by the motion detector after the motion detector is activated. The motion data may be first generated responsive to power being passed to a simulation deployment unit in which the motion detector is provided. The initial orientation may comprise a reference orientation relative to which subsequently generated motion data may be compared to determine a current orientation of the device. In some embodiments, the orientation may comprise a tilt angle. The tilt angle may comprise an angle between a direction in which the device is oriented and a reference angle. For example, a tilt angle of a device about an axis (e.g., x-axis) may comprise an angle between the direction to which the device is rotated about the axis relative to an axis perpendicular to the axis (e.g., z axis). An orientation may comprise a tilt angle about each axis of one or more axes of motion.

In embodiments, a position of a device may comprise a physical location of the device. The position may comprise a spatial position of the device. The position may be determined in three-dimensional space. The position may be determined along one or more axes. For example, a position may comprise a location of the device along one or more of a vertical axis, a lateral axis, and a depth axis perpendicular to a vertical axis and a depth axis. The position may comprise a relative position. For example, the position may be determined relative to one or more of an initial physical location of the device upon motion data initially being detected by the device, a physical position of a user, a physical position of a wearable unit, or a reference physical position in an environment in which a simulation system is being used. The position of the device may comprise a second set of three degrees of freedom of the device which may be modified by movement or motion being applied to the device. The movement may comprise translation of the device along one or more axes of motion.

Figure 2A:
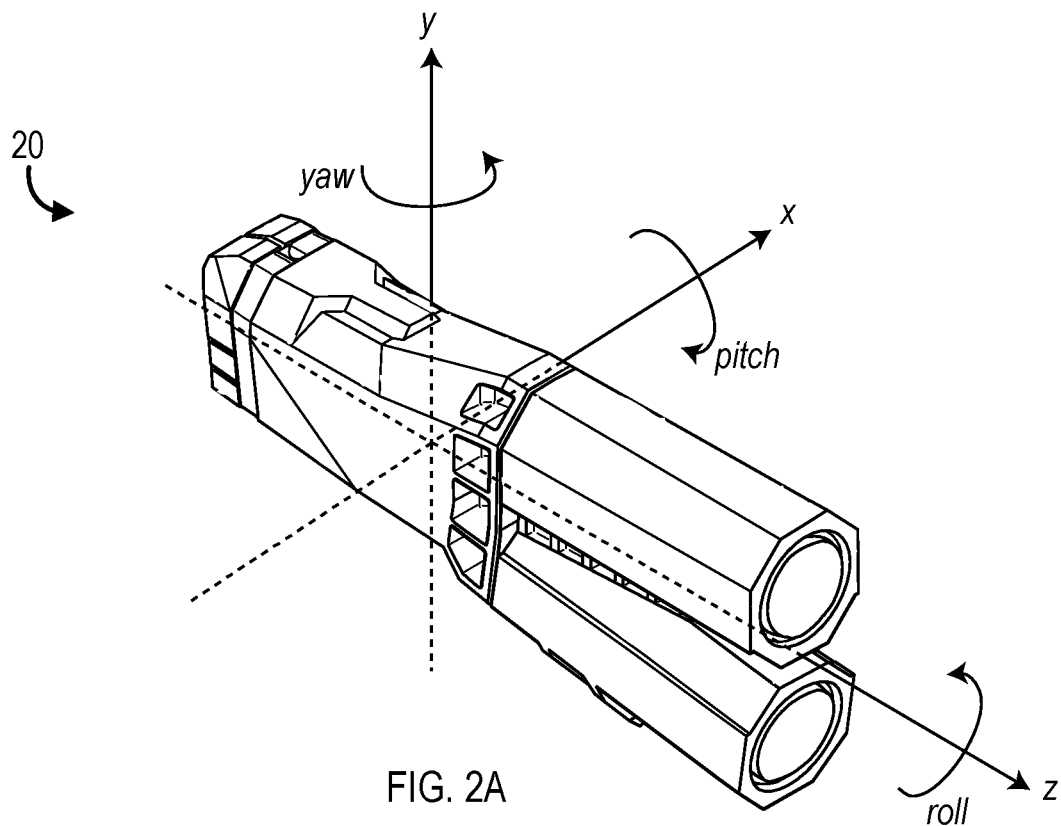
FIG. 2A illustrates a simulation deployment unit, in accordance with various embodiments described herein.
Figure 2B:
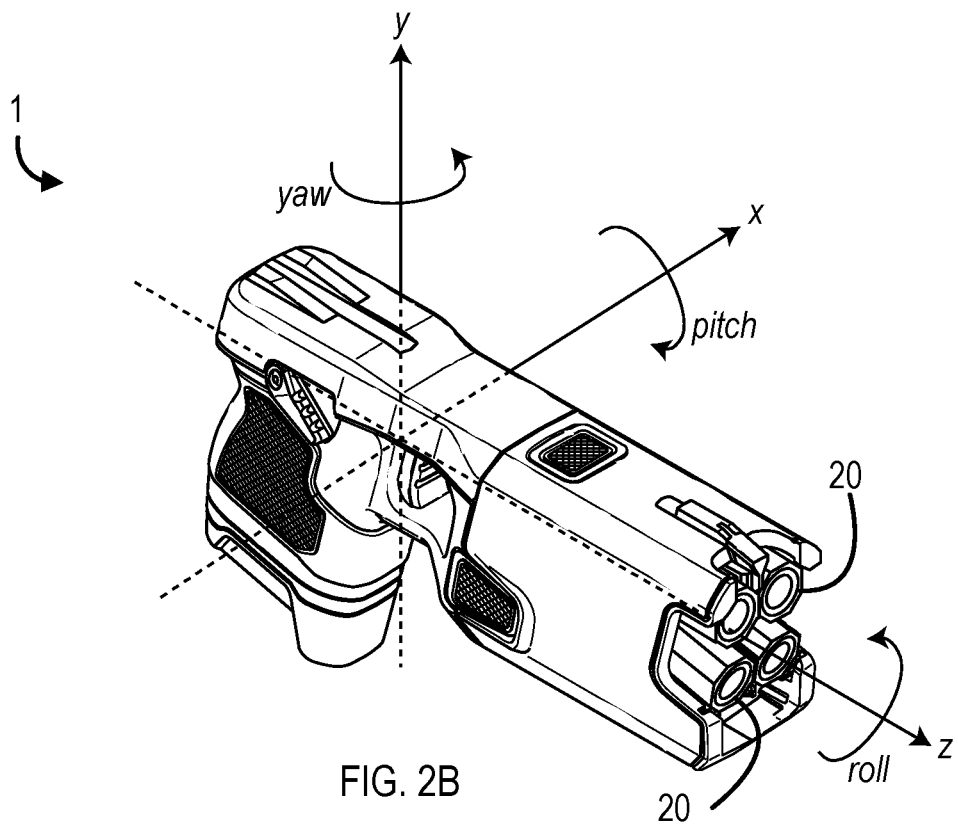
FIG. 2B illustrates a conducted electrical weapon, in accordance with various embodiments described herein.

FIGS. 2A-2B provide example illustrations of pitch, yaw, and roll with respect to axes defined by simulation deployment unit 20 and CEW 1 respectively. The pitch, yaw, and roll (e.g., tilt angles) may be determined based on one or more motion detectors located on or within simulation deployment unit 20, on or within CEW 1, or on or within a combination of simulation deployment unit 20 and CEW 1. For example, a simulator may receive a first input signal corresponding with motion data detected by one or more motion detectors located on or within simulation deployment unit 20 and a second input signal corresponding with motion data detected by one or more motion detectors located on or within CEW 1 to determine the tilt angles of simulation deployment unit 20 and CEW 1. Simulation deployment unit 20 and/or CEW 1 may include a combination of motion detectors such as accelerometers, gyroscopes, and magnetometers (e.g., compasses). Simulator 4 may use an input signal corresponding with motion data detected by the one or more motion detectors to determine velocity, orientation, and gravitational forces with respect to simulation deployment unit 20. In accordance with the motion data, simulator 4 may determine velocity, orientation, and/or gravitational forces of CEW 1 in which simulation deployment unit 20 is disposed. The motion data may comprise motion data of simulation deployment unit 20 and/or CEW 1. In embodiments, the motion data of simulation deployment unit 20 may be equal to, or used as equivalent to, motion data of CEW 1.

In embodiments, a handle of a CEW may lack one or more components required for integrating the handle in a simulation system. For example, the handle may lack a motion detector. The handle of the CEW may lack physical space by which the required component(s) may be integrated with the handle. Alternately or additionally, such required components may add unnecessary weight and/or require an excessive amount of space. Integrating such components in a handle may negatively impact a design or operation of the handle of the CEW. Such negative impacts may be provided, despite the handle potentially being operated in a simulation mode for a limited relative period of time relative to other operating modes, including a live or field mode. Embodiments according to various aspects enable a same handle of a CEW to be used in different operating modes, including live and simulation modes, without physical modification of the handle of the CEW. The same components of the handle may be used to further enable the handle to be integrated in simulation system.

Embodiments according to various aspects of the present disclosure also avoid a need for a separate simulation-specific handle for simulation-based training. A same handle may be employed for both live usage and simulation-based training, thereby improving fidelity of the simulation-based training relative to weaponry that may also be used in non-training scenarios.

Further, embodiments according to various aspects of the present disclosure may limit an extent or number of additional components included in a simulation deployment unit. A number of additional components required may be limited by utilizing components that may be separately provided in a handle. For example, a simulation deployment unit may be configured to employ a power supply and/or communication circuit disposed in a handle. Such an arrangement may avoid a need for duplicate such components being provided in the simulation deployment unit itself. Such an arrangement may also increase functionality of the components provided in the handle. By coupling to a bay of the handle of the CEW, the simulation deployment unit may also make use of a same communication interface usable by other types of cartridges, including live deployment units, thereby avoiding a need for separate ports or other communication interfaces to be added to the handle of the CEW to enable the handle to be integrated in a simulation system.

Figure 3:
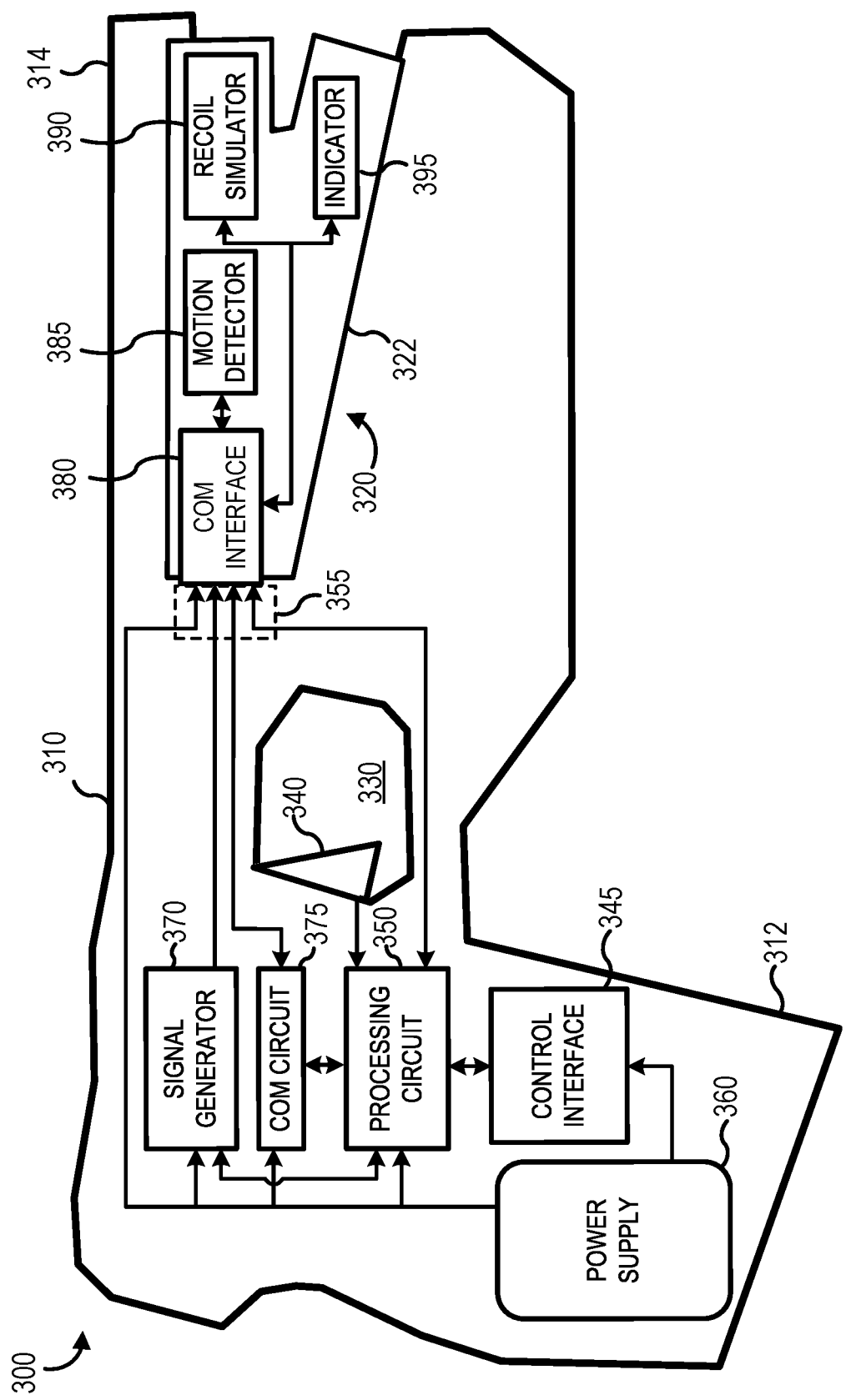
FIG. 3 illustrates a schematic diagram of a conducted electrical weapon, in accordance with various embodiments described herein.

In various embodiments, and with reference to FIG. 3, a schematic representation of CEW 300 is disclosed. CEW 300 may be similar to, or have similar aspects and/or components with, the CEWs previously discussed herein (e.g., CEW 1). It should be understood by one skilled in the art that FIG. 3 is a schematic representation of CEW 300, and one or more of the components of CEW 300 may be located in a suitable position within, or external to, handle 310. CEW 300 may comprise a handle 310 and a simulation deployment unit 320 (e.g., simulation cartridge, simulation magazine, etc.).

Handle 310 may house various components of CEW 300 configured to enable deployment of live deployment units (e.g., non-simulation deployment units, consumable deployment units, etc.), to enable cooperation with simulation deployment units, and to otherwise aid in the operation of CEW 300, as discussed further herein. Handle 310 may comprise a housing removably coupled to simulation deployment unit 320. Handle 310 may comprise one or more components operable to transmit and receive signals from a deployment unit (e.g., live deployment unit, simulation deployment unit 320, etc.). The one or more components may be integrated with the housing of handle 310. Although depicted as a firearm in FIG. 3, handle 310 may comprise any suitable shape and/or size. Handle 310 may comprise a handle end 312 opposite a deployment end 314. Deployment end 314 may be configured, and sized and shaped, to receive simulation deployment unit 320. Handle end 312 may be sized and shaped to be held in a hand of a user. For example, handle end 312 may be shaped as a handle to enable hand-operation of the CEW by the user (e.g., user 2). In various embodiments, handle end 312 may also comprise contours shaped to fit the hand of a user, for example, an ergonomic grip. Handle end 312 may include a surface coating, such as, for example, a non-slip surface, a grip pad, a rubber texture, and/or the like. As a further example, handle end 312 may be wrapped in leather, a colored print, and/or another suitable material, as desired.

Simulation deployment unit 320 may be configured to engage deployment end 314 of handle 310. Simulation deployment unit 320 may comprise any suitable shape and/or size to engage deployment end 314 of handle 310. Simulation deployment unit 320 may be couplable (e.g., engageable, separable, etc.) with handle 310. Simulation deployment unit 320 may comprise an inert deployment unit. An inert deployment unit may include a deployment unit that comprises no pyrotechnic material (e.g., primer, gun powder, etc.). Simulation deployment unit 320 may comprise a reusable (e.g., non-consumable, etc.) deployment unit.

In various embodiments, simulation deployment unit 320 may comprise a housing 322 comprising various mechanical, electronic, and electrical components configured to cooperate with CEW 300 to adapt CEW 300 into simulation weaponry for use in a simulation system, such as simulation system 3. For example, housing 322 may comprise one or more communication interfaces 380, motion detectors 385, recoil simulators 390, and/or indicators 395. Simulation deployment unit 320 may comprise housing 322 and various components selectively coupled (e.g., inserted, removed, etc.) to a bay of handle 310 via housing 322.

Communication interface (e.g., com interface) 380 may communicably couple simulation deployment unit 320 with handle 310. Communication interface 380 may be configured to electrically, electronically, and/or mechanically couple simulation deployment unit 320 with handle 310. Communication interface 380 may support communication as discussed herein. Communication interface 380 may include mechanical and/or electrical structures for communication. Communication interface 380 may comprise one or more electrical contacts configured to engage one or more respective electrical contacts of handle 310 for communication. Communication may include conducting electrical signals (e.g., connectors, spark gaps, etc.), supporting magnetic circuits, and passing optical signals. Communication interface 380 may comprise a bus configured to pass (e.g., couple, provide, etc.) data and/or power between one or more components in simulation deployment unit 320 and one or more components in handle 310. For example, communication interface 380 may comprise a serial peripheral interface (SPI), universal asynchronous receiver-transmitter (UART), universal synchronous and asynchronous receiver-transmitter (USART), or other interface configured to communicate data and/or power. Commands and/or status may be communicated between a processing circuit (e.g., processing circuit 350) and other circuits and/or components (e.g., motion detector 385, recoil simulator 390, indicator 395, etc.) via communication interface 380. Communication interface 380 may be communicably coupled with motion detector 385, recoil simulator 390, and/or indicator 395.

In embodiments, communication interface 380 and/or a portion of housing 322 may comprise one or more mechanical elements configured to selectively retain housing 322 in a bay of a housing of handle 310. The one or more mechanical elements may be selectively connected to corresponding mechanical elements integrated with the housing of handle 310. For example, the mechanical elements may comprise one or more protrusions, receivers, hooks, latches, rims, slides, guides, slots, posts, magnets, ferromagnetic materials, or other physical elements operable to selectively engage simulation deployment unit 320 with handle 310. In embodiments, communication interface 380 may be enabled to communicate with handle 310 when mechanical elements of handle 310 and simulation deployment unit 320 are engaged.

Motion detector 385 may be communicably coupled with communication interface 380. Motion detector 385 may provide motion data corresponding with motion of simulation deployment unit 320 to handle 310 via communication interface 380. Motion detector 385 may be configured to pass motion data corresponding with motion of simulation deployment unit 320 through communication interface 380. In embodiments, the motion data may comprise a digital signal or, in additionally or alternatively to such a digital signal, the motion data may comprise an analog signal that is received by handle 310 converted into a corresponding digital signal.

In various embodiments, motion detector 385 may be configured to detect motion of simulation deployment unit 320. Motion detector 385 may be similar to, or share similar aspects with, the motion detectors discussed previously herein. Motion detector 385 may report motion data to processing circuit 350. Processing circuit 350 may perform calculations on the motion data provided by motion detector 385 to determine at least one of a change in position, a change in orientation, or an initial orientation of CEW 300. For example, motion detector 385 may report motion along an x-axis, along a y-axis, along a z-axis, about an x-axis, about a y-axis, and/or about a z-axis. Processing circuit 350 may determine whether the motion reported along and/or about the axes corresponds to movement of CEW 300. Processing circuit 350 may use the data from motion detector 385 to detect movement along or about a direction (e.g., along an axis, about an axis, etc.).

An operation performed by a processing circuit may include providing power to or removing power from one or more components of the CEW. A processing circuit may cooperate with a power supply to provide power to or remove power from one or more components of the CEW. For example, processing circuit 350 may instruct power supply 360 to provide power to motion detector 385 via communication interface 380. Motion detector 385 may rely on (e.g., require) power provided by handle 310 to detect motion data corresponding with motion of simulation deployment unit 320. For example, a motion sensor (e.g., gyroscope, accelerometer, IMU, etc.) may detect motion of simulation deployment unit 320 using the received power. The motion data may be generated using the received power. Unless power is provided to simulation deployment unit 320, motion detector 385 may not detect motion of simulation deployment unit 320. Absent power being provided to simulation deployment unit 320, motion data may not be provided from motion detector 385 via communication interface 380. Motion data may not be generated by motion detector 385 until power is received. Simulation deployment unit 320 may not be self-contained. Simulation deployment unit 320 may not enable motion detector 385 to be operable separate handle 310. Simulation deployment unit 320 may lack a power supply coupled or couplable to motion detector 385 that enables motion data to be generated. Simulation deployment unit 320 may require components from another device to perform operations, including generating motion data and transmitting the motion data to a remote computing device.

In embodiments, providing power to a simulation deployment unit may comprise providing an electrical signal via a second communication interface 355. Second communication interface 355 may be integrated with a housing of handle. Second communication interface 355 may be disposed in a bay of handle 310. The same bay of handle 310 may receive live deployment units during live usage of handle 310. Communication interface 355 of handle 310 may comprise a same communication interface of handle 310 by which one or more electrical signals may be provided for different types of deployment units. For example, communication interface 355 may provide one or more signals to each of a live deployment unit, a training deployment unit, and a simulation deployment unit. A same communication interface, communication interface 355 may provide signals to each different type of deployment unit. The signals may be provided when each type of deployment unit is respectively coupled to communication interface 355. However, signals provided via the communication interface 355 may be different in accordance with a type of deployment unit coupled to communication interface 355. For example, an electrical signal to provide power for the simulation deployment unit may be distinct from an electrical signal provided for a live deployment unit. An electrical signal for providing power may comprise a lower voltage and/or longer duration than an ignition signal or stimulus signal provided to a live deployment unit. An electrical signal for providing power may be provided while CEW 300 is disposed in a simulation mode, whereas an electrical signal (e.g., ignition signal, stimulus signal, etc.) provided to a live deployment unit may be provided to deploy an electrode from a live deployment unit. The electrical signal to provide power may not be provided to other types of deployment units, including live deployment units. An electrical signal provided to a live deployment unit may be provided responsive to trigger 340 or control interface 345. In contrast, an electrical signal to provide power to a simulation deployment unit may be provided independent of an operation of this same element (e.g., trigger 340 or control interface 345).

In embodiments, enabling a motion detector may comprise powering the motion detector. The motion detector may rely on the power to detect motion data. Absent the power, the motion detector may not detect motion data. The motion detector may be deactivated unless power is received via the communication interface. In embodiments, simulation deployment unit 320 may lack a separate power supply from 360 and/or otherwise remain inoperable to provide motion data via communication interface 380 unless communication interface 380 is engaged with handle 310 to receive a power supply signal. Communication interface 380 may be coupled to handle via communication interface 355.

In embodiments, enabling a motion detector may comprise transmitting motion data from the motion detector. The motion detector may begin providing the motion data to a handle upon receiving power from the handle. The motion detector may continue to provide the motion data to the handle while power is received from the handle. Until the power is received, the motion detector may operate in a low power state or an unpowered state. Output of the motion data may be controlled (e.g., started, ended, continued, etc.) in accordance with whether power is received from the handle, independent of whether the motion detector fully or partially requires the power in order to perform operations, including generating motion data.

In various embodiments, recoil simulator 390 may be configured to simulate recoil or otherwise provide haptic feedback to a user. The haptic feedback may be configured to simulate forces imparted on a user during deployment of a live deployment unit. The haptic feedback may be configured to simulate recoil of a CEW. A recoil simulator may be configured to provide the haptic feedback responsive to receiving an activation signal.

Recoil simulator 390 may be communicably coupled with communication interface 380. Recoil simulator 390 may receive one or more activation signals from handle 310 via communication interface 380. Recoil simulator 390 may comprise an electromechanical component comprising a mass that is configured to move responsive to recoil simulator 390 receiving the activation signal. For example, recoil simulator 390 may comprise an actuator (e.g., pneumatic, hydraulic, solenoid, etc.), a direct current (DC) motor, a rotary motor, a linear motor, or other electromechanical component comprising a mass that is configured to move responsive to an electrical signal.

In various embodiments, recoil simulator 390 may comprise a linear motor. A linear motor may produce a linear force along its longitudinal length, as opposed to a torque through rotation. The linear motor may comprise a Lorentz-type actuator, wherein the applied force is linearly proportional to the current and the magnetic field. An electromagnetic force may provide direct linear movement without the use of cams, gears, belts, or other mechanical devices.

In various embodiments, recoil simulator 390 may comprise a solenoid. A solenoid may comprise a coil wound into a tightly packed helix. The coil may be wrapped around a metallic core and may produce a magnetic field when an electric current is passed through it. A solenoid may comprise a transducer that converts energy into linear motion. A solenoid may comprise an electromechanical solenoid, such as a linear solenoid.

Electromechanical solenoids may include an electromagnetically inductive coil, wound around a movable ferrous (e.g., steel, iron, etc.) slug (e.g., armature, plunger, etc.). An electromechanical solenoid may be controlled by a processing circuit, such as processing circuit 350. The armature of a solenoid may comprise a ferromagnetic material. The coil may be shaped such that the armature may be moved in and out of the center of the coil, thereby altering the coil's inductance and forming an electromagnet. The armature may be used to provide a mechanical force to simulate recoil of a CEW. The force applied to the armature may be proportional to a change in inductance of the coil with respect to a change in position of the armature and the current flowing through the coil (e.g., Faraday's law of induction). A force applied to the armature may move the armature in a direction that increases the coil's inductance.

In various embodiments, indicator 395 may be configured to cooperate with handle 310 to cause CEW 300 to operate as a simulation weapon (e.g., enter a simulation mode). An indicator may provide information to a handle (e.g., handle 310). An indicator may cooperate with a handle for automatic communication of indicia conveying information from the indicator to the handle. Information may be communicated in a conventional manner. For example, information may be communicated by sourcing a signal by the indicator or by modulating by the indicator a signal sourced by the handle. Information may be conveyed by a conventional property of the communicated signal. For example, indicator 395 may include a passive electrical, magnetic, or optical circuit or component to affect an electrical charge, current, electric field, magnetic field, magnetic flux, or radiation (e.g., light) sourced by handle 310. Presence (or absence) of the charge, current, field, flux, or radiation at a particular time or times may be used to convey information via communication interface 380. Relative position of indicator 395 with respect to detectors in handle 310 may convey information. In various implementations, the indicator may include one or more of the following: resistances, capacitances, inductances, magnets, magnetic shunts, resonant circuits, filters, optical fiber, reflective surfaces, and memory devices.

Indicator 395 may comprise one or more elements. In various embodiments, indicator 395 may include a conventional passive radio frequency identification tag circuit (e.g., having an antenna or operating as an antenna). Indicator 395 may include a mirrored surface or lens that diverts light sourced by handle 310 to predetermined locations of detectors or sensitive areas in handle 310. Indicator 395 may include a magnet, the position and polarity thereof being detected by handle 310 (e.g., via one or more reed switches). Indicator 395 may include one or more portions of a magnetic circuit, the presence and/or relative position of which are detectable by the remainder of the magnetic circuit in handle 310. Indicator 395 may be coupled to handle 310 by a conventional connector (e.g., pin and socket). Indicator 395 may include an impedance through which a current provided by handle 310 passes.

In various embodiments, indicator 395 may include a combination of the above communication technologies. Indicator 395 may communicate using analog and/or digital techniques. When more than one bit of information is to be conveyed, communication may be in serial, time multiplexed, frequency multiplexed, or communicated in parallel (e.g., multiple technologies or multiple channels of the same technology).

Information indicated by indicator 395 may be communicated in a coded manner (e.g., an analog value conveys a numerical code, a communicated value conveys an index into a table in the launch device that more fully describes the meaning of the code). The information may include a description of simulation deployment unit 320. For example, descriptive information may include the type of deployment unit (e.g., simulation deployment unit, deployment unit for virtual reality training, deployment unit for augmented reality training, etc.), a manufacturer of the deployment unit, a date of manufacture of the deployment unit, a capability of the deployment unit, an incapability of the deployment unit, a deployment unit model identifier, a serial number of the deployment unit, a compatibility with a model of handle, and/or value(s) stored in a memory of deployment unit 320 (e.g., stored at the manufacturer, stored by the handle upon installation of the deployment unit with that particular handle). The descriptive information, upon being received by handle 310, may enable processing circuit 350 to distinguish a simulation deployment unit from other types of deployment units, including live, non-training deployment units.

In various embodiments, indicator 395 may comprise a memory that stores indicia. The memory may be configured to store and maintain data. In that regard, processing circuit 350 may communicate with the memory to transmit and retrieve indicia from the memory.

A memory of indicator 395 may store a unique identifier (e.g., a deployment unit identifier, etc.). The unique identifier may uniquely identify simulation deployment unit 320, and/or uniquely be associated with characteristics of simulation deployment unit 320. Processing circuit 350 may comprise, or be in communication with, a memory configured to store a list, table, or the like of unique identifiers and associated deployment unit characteristics. In that regard, processing circuit 350 may communicate with a memory of indicator 395 to retrieve the unique identifier. Processing circuit 350 may communicate with the memory of processing circuit 350 to determine the deployment unit characteristics based on the unique identifier.

In embodiments, indictor 395 may comprise an external indictor. The external indicator may identify the simulation deployment unit 320 separate from an internal indicator configured to provide indicia to handle 310. For example, the external indicator may comprise a light emitting diode coupled to housing 322. The external indicator may comprise a light emitting diode position on each side of housing 322. The external indicator may enable the simulation deployment unit 320 to be visually identified from each side of a bay of handle 310. The external indicator may emit light responsive to power being passed to simulation deployment unit 320. The external indictor may be visible when simulation deployment unit 320 is engaged with handle 310. In some embodiments, the external indicator may be detected via a head-mounted unit 5. In accordance with detecting the external indicator, simulation processing circuit 6 may detect, verify, and or refine a position of CEW 300 as represented in a display 7. The detection of the external indicator may enable the position of CEW 300 to be separately determined relative to a field of view of a user as provided via display 7 by simulation processing circuit 6. Alternately or additionally, detection of the external indicator may enable the head-mounted unit 5 to detect that a simulation deployment unit has been inserted into a handle proximate the unit 5.

In various embodiments, handle 310 may comprise various mechanical, electronic, and electrical components configured to aid in performing the functions of CEW 300. For example, handle 310 may comprise one or more triggers 340, control interfaces 345, processing circuits 350, power supplies 360, signal generators 370, and/or communication circuits (e.g., com circuits, etc.) 375. The components may be integrated with a housing of handle 310, separable from simulation deployment unit 320 and respective components of simulation deployment unit 320.

In various embodiments, handle 310 may include a guard 330. Guard 330 may define an opening formed in handle 310. Guard 330 may be located on a center region of handle 310 (e.g., as depicted in FIG. 3), and/or in other suitable locations on handle 310. Trigger 340 may be disposed within guard 330. Guard 330 may be configured to protect trigger 340 from unintentional physical contact (e.g., an unintentional activation of trigger 340). Guard 330 may surround trigger 340 within handle 310.

In various embodiments, trigger 340 be coupled to an outer surface of handle 310, and may be configured to move, slide, rotate, otherwise become physically depressed upon application of the physical contact. For example, trigger 340 may be actuated by physical contact applied to trigger 340 from within guard 330. Trigger 340 may comprise a mechanical or electromechanical switch, button, trigger, or the like. For example, trigger 340 may comprise a switch, a pushbutton, and/or another suitable type of trigger. Trigger 340 may be mechanically and/or electronically coupled to processing circuit 350. In response to trigger 340 being activated (e.g., actuated, depressed, pushed, etc. by the user), processing circuit 350 may receive an activation signal corresponding to trigger 340 being activated. The activation signal may comprise a mechanical and/or electrical signal. The activation signal may include an electrical signal generated responsive to a received mechanical signal associated with actuation of trigger 340. In response to trigger 340 being activated (e.g., actuated, depressed, pushed, etc. by the user), processing circuit 350 may enable activation of a recoil simulator of simulation deployment unit 320, as discussed further herein.

In various embodiments, processing circuit 350 may be mechanically and/or electronically coupled to trigger 340. Processing circuit 350 may be configured to detect an activation, actuation, depression, input, etc. (collectively, an "activation event") of trigger 340. In response to detecting the activation event, processing circuit 350 may be configured to perform various operations and/or functions, as discussed further herein. Processing circuit 350 may also include a sensor (e.g., a trigger sensor) attached to trigger 340 and configured to detect an activation event of trigger 340. The sensor may comprise a suitable mechanical and/or electronic sensor capable of detecting an activation event in trigger 340 and reporting the activation event to processing circuit 350. An activation signal representing the activation event may be reported to processing circuit 350 by trigger 340.

In various embodiments, processing circuit 350 may be electrically and/or electronically coupled to power supply 360. Processing circuit 350 may receive power from power supply 360. The power received from power supply 360 may be used by processing circuit 350 to receive signals, process signals, and transmit signals to various other components in CEW 300. Processing circuit 350 may use power from power supply 360 to detect an activation event of trigger 340, a control event of control interface 345, or the like, and generate one or more control signals in response to the detected events. The control signal may be based on the control event and the activation event. The control signal may be an electrical signal.

In various embodiments, power supply 360 may be configured to provide power to various components of CEW 300. For example, power supply 360 may provide energy for operating the electronic and/or electrical components (e.g., parts, subsystems, circuits) of CEW 300 and/or simulation deployment unit 320. Power supply 360 may provide electrical power. Providing electrical power may include providing a current at a voltage. Power supply 360 may be electrically coupled to processing circuit 350 and/or signal generator 370. Power supply 360 may be electrically coupled to communication interface 380 of simulation deployment unit 320 when simulation deployment unit 320 is engaged with handle 310. When simulation deployment unit 320 is engaged with handle 310, power supply 360 may be configured to pass power through communication interface 380 to various components of simulation deployment unit 320, such as motion detector 385, recoil simulator 390, and/or indicator 395. In some embodiments, power supply 360 may be coupled to communication interface 380 via processing circuit 350 and/or signal generator 370 to provide electrical power to simulation deployment unit 320 via communication interface 380. Based on the power, the motion data may subsequently be provided to handle 310 via a same communication interface (e.g., communication interface 380) through which the power was provided to motion detector 385. Accordingly, power supply 360 in a first housing (e.g., a housing of handle 310) may be configured to selectively provide power to a motion detector (e.g., motion detector 385) in a removable, second housing (e.g., housing 322 of deployment unit 320).

In various embodiments, in response to control interface 345 comprising electronic properties and/or components, power supply 360 may be electrically coupled to control interface 345. In various embodiments, in response to trigger 340 comprising electronic properties or components, power supply 360 may be electrically coupled to trigger 340. Power supply 360 may provide an electrical current at a voltage. Electrical power from power supply 360 may be provided as a direct current ("DC"). Electrical power from power supply 360 may be provided as an alternating current ("AC"). Power supply 360 may include a battery. The energy of power supply 360 may be renewable or exhaustible, and/or replaceable. For example, power supply 360 may comprise one or more rechargeable or disposable batteries. In various embodiments, the energy from power supply 360 may be converted from one form (e.g., electrical, magnetic, thermal) to another form to perform the functions of a system.

Power supply 360 may provide energy for performing the functions of CEW 300. For example, power supply 360 may provide the electrical current to signal generator 370 that is provided through a target to impede locomotion of the target (e.g., via a live, non-simulation deployment unit). Power supply 360 may provide the energy for a stimulus signal. Power supply 360 may provide the energy for other signals, including an ignition signal or an activation signal discussed further herein.

Processing circuit 350 may be similar to, or have similar aspects and/or components with, the processing circuits previously discussed herein. In various embodiments, a CEW may comprise a memory configured to store data, instructions, programs, or the like. The memory may comprise a tangible non-transitory computer-readable memory. Processing circuit 350 may comprise or be in communication with the memory. Processing circuit 350 may communicate with the memory to access, retrieve, and/or transmit data, instructions, and/or programs to the memory. Instructions stored on the tangible non-transitory memory may allow processing circuit 350 to perform various operations, functions, and/or steps, as described herein. For example, in response to processing circuit 350 executing the instructions on the tangible non-transitory memory, processing circuit 350 may communicate with one or more components of simulation deployment unit 320 via communication interface 380 as discussed herein. In various embodiments, processing circuit 350 may execute the instructions in response to operation of control interface 345, and/or trigger 340, as discussed further herein.

Processing circuit 350 may control the operation and/or function of other circuits and/or components of CEW 300. Processing circuit 350 may receive status information regarding the operation of other components, perform calculations with respect to the status information, and provide commands (e.g., instructions) to one or more other components. Processing circuit 350 may command another component to start operation, continue operation, alter operation, suspend operation, cease operation, or the like. Commands and/or status may be communicated between processing circuit 350 and other circuits and/or components via a bus (e.g., SPI bus) including a data/address bus.

Processing circuit 350 may cooperate with indicator 395 of simulation deployment unit 320 via communication interface 380 to determine indicia describing simulation deployment unit 320. Upon determining simulation deployment unit 320 is a simulation deployment unit, processing circuit 350 may cause CEW 300 to operate in a simulation mode, in which CEW 300 may perform functions of simulation weaponry as discussed herein.

Processing circuit 350 may receive motion data from motion detector 385 corresponding with movement of simulation deployment unit 320. Processing circuit 350 may perform one or more operations on the motion data. For example, processing circuit 350 may apply an error checking operation to the motion data. The error checking operation may detect corrupted motion data and/or motion data that may differ from previously received motion data by an amount that exceeds an error threshold. Processing circuit 350 may perform calculations on motion data provided by motion detector 385 to determine at least one of a change in position, a change in orientation, or an initial orientation of CEW 300. Processing circuit 350 may determine whether the motion reported along and/or about the axes corresponds to movement of CEW 300. Processing circuit 350 may use the data from motion detector 385 to detect movement in a direction (e.g., along an axis, about an axis, etc.).

In various embodiments, communication circuit 375 may transmit and/or receive information (e.g., data, input data, etc.). A communication circuit may transmit and/or receive (e.g., communicate) information via a wired and/or wireless communication link. A communication circuit may communicate using wireless (e.g., radio, light, sound, vibrations) and/or wired (e.g., electrical, optical) mediums. A communication circuit may communicate using a wireless (e.g., BLUETOOTH, Zigbee, WAP, Wi-Fi, NFC, IrDA, LTE, BLE, EDGE, EV-DO) and/or wired (e.g., USB, RS-232, Firewire, Ethernet) communication protocols.

A communication circuit may receive information from a processing circuit for transmission. A communication circuit may provide received information to a processing circuit.

A communication circuit in one device (e.g., handle 310) may communicate with a communication circuit in another device (e.g., server 13, simulation processing circuit 6, etc.). Communications between two devices may permit the two devices to cooperate in performing a function of either device. For example, a user interface for a handle may be implemented on a simulator that includes a touch screen. User interaction with the user interface on the simulator may be communicated to the handle via the communication circuits of the simulator and the handle. The handle may perform the function indicated by the input from the simulator. Information produced by the handle for the user may be communicated from the handle to the simulator via the communication circuits for projection on a display of the simulator (e.g., display 4).

In various embodiments, communication circuit 375 may be electrically and/or electronically coupled to power supply 360. Power supply 360 may provide energy to communication circuit 375 to enable communication circuit 375 to transmit information and receive information.

In various embodiments, communication circuit 375 may be electrically and/or electronically coupled to processing circuit 350. Processing circuit 350 may transmit an input signal corresponding with motion data provided by motion detector 385 to a simulator via communication circuit 375. Processing circuit 350 may transmit an operation of handle 310 (e.g., trigger status, control interface status, safety status, etc.) to a simulator via communication circuit 375. Transmitting the operation of handle 310 may comprise transmitting operation data. In an implementation, communication circuit 375 may comprise a BLUETOOTH transmitter.

In various embodiments, processing circuit 350 may be electrically and/or electronically coupled to signal generator 370. Processing circuit 350 may be configured to transmit or provide control signals to signal generator 370 in response to detecting an activation event of trigger 340. Multiple control signals may be provided from processing circuit 350 to signal generator 370 in series. In response to receiving the control signal, signal generator 370 may be configured to perform various functions and/or operations, as discussed further herein.

In various embodiments, control interface 345 may be configured to control selection of firing modes in CEW 300. Controlling selection of firing modes in CEW 300 may include disabling firing of CEW 300 (e.g., a safety mode), enabling firing of CEW 300 (e.g., an armed mode) and/or similar operations. In response to a user selecting one of the control modes, control interface 345 may transmit instructions to processing circuit 350 based on the selection.

In embodiments, a firing mode of a CEW may be different from an operating mode of the CEW. A firing mode may correspond to one or more operations of a control interface of the CEW. In contrast, an operating mode may correspond to a type of deployment unit that is received by a handle of the CEW. An operating mode may identify a set of signals that may be provided to a communication interface integrated with the handle of the CEW. Different sets of signals may be applied to the communication interface in accordance with different operating modes. For example, the different operating modes may comprise a field mode, a training mode, and a simulation mode. A field mode, also referred to as a live mode herein, may be associated with a live deployment unit and providing one or more stimulus signals to a target via remote delivery. A training mode may be associated with a training deployment unit and deployment of training electrodes to a training target without the stimulus signal being provided to the training target. A simulation mode may be associated with a simulation deployment unit and simulated deployment of electrodes without deploying physical electrodes or otherwise providing remote delivery of a stimulus signal. Unlike the training mode and field mode, the simulation mode may be associated with transmission of one or more input signals from the handle to a simulator. Input signals usable to adjust a virtual object may not be transmitted by a handle in accordance with operating modes other than a simulation mode. The firing mode may be adjustably selected while the CEW is disposed in each operating mode. However, one or more operations subsequently performed by the CEW may be different for each firing mode in accordance with the particular operating mode in which the CEW is disposed.

Control interface 345 may be located in a suitable location on or in handle 310. For example, control interface 345 may be coupled to an outer surface of handle 310. Control interface 345 may be coupled to an outer surface of handle 310 proximate trigger 340 and/or guard 330. Control interface 345 may be electrically, mechanically, and/or electronically coupled to processing circuit 350. In various embodiments, in response to control interface 345 comprising electronic properties or components, control interface 345 may be electrically coupled to power supply 360. Control interface 345 may receive power (e.g., electrical current) from power supply 360 to power the electronic properties or components.

Control interface 345 may be electronically or mechanically coupled to trigger 340. For example, and as discussed further herein, control interface 345 may function as a safety. In response to control interface 345 being set to a "safety mode," CEW 300, communication circuit 375 may transmit the status of the control interface to simulator 4. Communication circuit 375 may transmit the status of control interface 345 to simulation processing circuit 6 and/or server 13 so that a status of a control interface of a virtual CEW (e.g., virtual CEW 9) generated by simulator 4 corresponds with the status of control interface 345. The status of the control interface of the virtual CEW (e.g., virtual CEW 9) may be updated by simulator 4 to correspond with the status of control interface 345. Control interface 345 may provide a signal (e.g., a control signal) to processing circuit 350 instructing processing circuit 350 to disable deployment of simulation deployment units 320. Communication circuit 375 may relay this signal to simulator 4, so that deployment of the virtual CEW corresponding with CEW 300 is also disabled. As a further example, control interface 345 may electronically or mechanically prohibit trigger 340 from activating (e.g., prevent or disable a user from depressing trigger 340). As a further example, control interface 345 may electronically disable signal generator 370, thereby preventing a stimulus signal from being generated or output when CEW 300 is disposed in a simulation mode. In some embodiments, a control signal may be provided from processing circuit 350 to disable signal generator 370, thereby preventing the stimulus signal from being generated. In such embodiments, processing circuit 350 may provide an activation signal and/or other signals to simulation deployment unit 320, rather than other components of handle 310 by which signals are provided to second communication interface 355 in other operating modes. Communication circuit 375 may transmit status or other information of control interface 345 and/or trigger 340 as one or more second input signals. Accordingly, communication circuit 375 may be configured to transmit input signals generated in both a same housing (e.g., housing of handle 310) and a different housing (e.g., housing 322) in which communication circuit 375 is integrated. Communication circuit 375 may be further configured to transmit input signals generated based on inputs received by processing circuit 350 independent of whether a simulation deployment unit is coupled to handle 310. For example, communication circuit 375 may be configured to transmit a status associated with activation of trigger 340 in a live mode of operation of CEW 300, when a simulation deployment unit is not coupled to handle 310.

A safety mode enabled on simulation weaponry may be configured to prohibit deployment of deployment units of a virtual CEW corresponding with the simulation weaponry. For example, in response to a user selecting a safety mode on CEW 300, control interface 345 may transmit a safety mode instruction to processing circuit 350. In response to receiving the safety mode instruction, processing circuit 350 may instruct communication circuit 375 to transmit the safety mode instruction to simulator 4 to prohibit deployment of a virtual CEW generated by simulator 4. Processing circuit 350 may prohibit deployment of the virtual CEW until a further instruction is received from control interface 345. As previously discussed, control interface 345 may interact with trigger 340 to prevent activation of trigger 340.

Control interface 345 may comprise a suitable electronic or mechanical component capable of enabling selection of firing modes in CEW 300. For example, control interface 345 may comprise a fire mode selector switch, a safety switch, a safety catch, a rotating switch, a selection switch, a selective firing mechanism, and/or other mechanical control switch. As a further example, control interface 345 may comprise a touch screen or similar electronic component. As a further example, control interface 345 may comprise a slide, pistol slide, reciprocating slide, or the like.

In various embodiments, processing circuit 350 may be mechanically and/or electronically coupled to control interface 345. Processing circuit 350 may be configured to detect an activation, actuation, depression, input, etc. (collectively, a "control event") of control interface 345. In response to detecting the control event, processing circuit 350 may be configured to perform various operations and/or functions, as discussed herein. Processing circuit 350 may also include a sensor (e.g., a control sensor) attached to control interface 345 and configured to detect a control event of control interface 345. The sensor may comprise a mechanical and/or electronic sensor capable of detecting a control event in control interface 345 and reporting the control event to processing circuit 350.

In various embodiments, signal generator 370 may be configured to receive one or more control signals from processing circuit 350. Signal generator 370 may provide an activation signal to simulation deployment unit 320 based on the control signals. Signal generator 370 may be electrically and/or electronically coupled to processing circuit 350 and/or simulation deployment unit 320 via communication interface 380 of simulation deployment unit 320. Signal generator 370 may be electrically coupled to power supply 360. Signal generator 370 may use power received from power supply 360 to generate an activation signal. In some embodiments, signal generator 370 may provide other signals to a simulation deployment unit, including an electrical signal by which power is provided to the simulation deployment unit. Responsive to the one or more control signals, signal generator 370 may provide one or more different signals to communication interface 355 of a bay of the housing of handle 310. The one or more signals may be different relative to one or more other signals provided to different types of deployment units, including in accordance with an operation mode of handle 310.

Signal generator 370 may be controlled entirely or in part by processing circuit 350. In various embodiments, signal generator 370 and processing circuit 350 may be separate components (e.g., physically distinct and/or logically discrete). Signal generator 370 and processing circuit 350 may be a single component. For example, a control circuit within handle 310 may at least include signal generator 370 and processing circuit 350. The control circuit may also include other components and/or arrangements, including those that further integrate corresponding function of these elements into a single component or circuit, as well as those that further separate certain functions into separate components or circuits.

Responsive to receipt of a signal indicating activation of trigger 340 (e.g., an activation event), a control circuit may provide an activation signal to recoil simulator 390 via communication interface 380. For example, signal generator 370 may provide an electrical signal as an activation signal to recoil simulator 390 to cause recoil simulator to simulate recoil in response to receiving a control signal from processing circuit 350. Signal generator 370 may also provide a ground signal path for recoil simulator 390, thereby completing a circuit for an electrical signal provided to recoil simulator 390 by signal generator 370. The ground signal path may also be provided to recoil simulator 390 by other elements in handle 310, including power supply 360.

Processing circuit 350 may be electrically and/or electronically coupled to simulation deployment unit 320. Processing circuit 350 may be configured to determine indicia describing simulation deployment unit 320. Indicia describing simulation deployment unit 320 may include a deployment unit type, a deployment instruction, and/or other desired information relating to a deployment unit or the CEW. Indicia describing simulation deployment unit 320 may be stored and/or provided by indicator 395.

Figure 4:
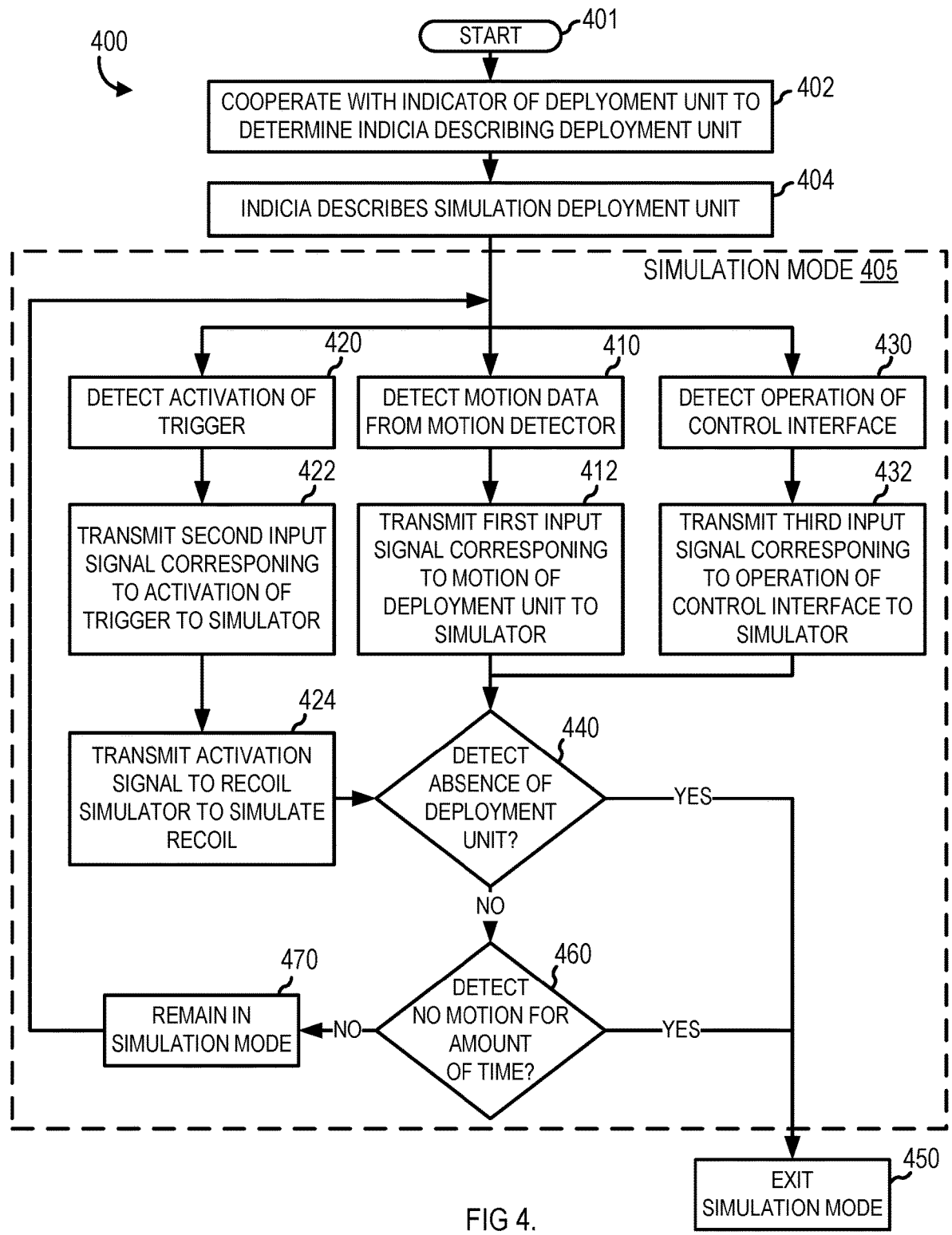
FIG. 4 illustrates a method performed by a conducted electrical weapon, in accordance with various embodiments described herein.
Figure 5:
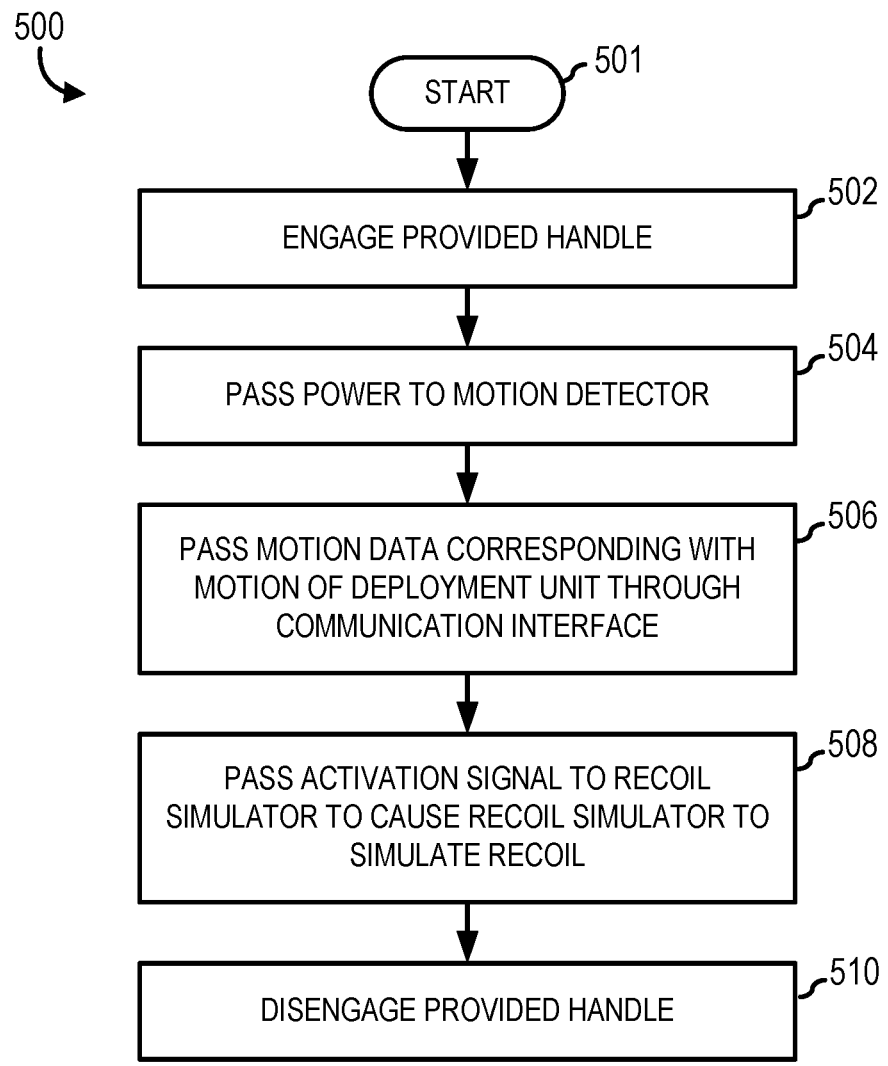
FIG. 5 illustrates a method performed by a simulation deployment unit, in accordance with various embodiments described herein.

Referring now to FIGS. 4-5, the process flows depicted are merely embodiments and are not intended to limit the scope of the disclosure. For example, the steps recited in any of the method or process descriptions may be executed in any order and are not limited to the order presented. As a further example, one or more steps recited in any of the method or process descriptions may be omitted.

In various embodiments, and with specific reference to FIG. 4, a method 400 performed by a conducted electrical weapon (e.g., CEW 300, CEW 1, etc.) is disclosed. A CEW and/or a processing circuit (e.g., processing circuit 350 of CEW 300, with brief reference to FIG. 3) may be configured to perform one or more steps of method 400. At block 401, processing circuit begins execution of method 400.

In various embodiments, at block 402, processing circuit 350 may cooperate with an indicator of a deployment unit (e.g., indicator 395 of simulation deployment unit 320) to determine indicia describing the deployment unit. Processing circuit 350 may cooperate with the indicator upon engagement of the deployment unit with the CEW. The indicator may cooperate with processing circuit 350 for automatic communication of indicia conveying information from the indicator to processing circuit 350.

In embodiments, a processing circuit of a conducted electrical weapon may select an operating mode of the conducted electrical weapon in accordance with indicia detected from a deployment unit. The operating mode may comprise a first operating mode of a plurality of operating modes of the conducted electrical weapon. The operating mode may correspond to a type of deployment unit. For example, the processing circuit may select a simulation mode in accordance with detecting indicia of a simulation deployment unit. The processing circuit may select a live mode in accordance with detecting indicia of a live deployment unit. The processing unit may select a training mode in accordance with detecting indicia of a training deployment unit. The plurality of operating modes may comprise two or more of the simulation mode, the live mode, or the training mode according to various aspects of the present disclosure. The plurality of operating modes may comprise at least the simulation mode and the live mode according to various aspects of the present disclosure. In other embodiments, the operating mode may be selectable via a control interface of the conducted electrical weapon. A portion of the control interface or input received via the control interface operable to select the operating mode may be different from another portion of the control interface or input received via the control interface operable to select a firing mode of the conducted electrical weapon.

In various embodiments, a handle of a conducted electrical weapon may be configured to provide and/or receive one or more signals to a coupled deployment unit in accordance with an operating mode of the conducted electrical weapon. The one or more signals may be different. For example, the handle may be configured to provide a power signal to a coupled deployment unit in accordance with a simulation mode of the conducted electrical weapon. The power signal may not be provided to a coupled deployment unit in accordance with other modes of a plurality of operating modes of the conducted electrical weapon. The handle may alternatively or additionally be configured to receive one or more input signals associated with motion data from the coupled deployment unit in accordance with a simulation mode of the conducted electrical weapon. The power signal and/or input signals may be provided and received continuously while in the simulation mode. The handle may be configured to provide a stimulus signal to the coupled deployment unit in accordance with a live mode of the conducted electrical weapon. The stimulus signal may not be provided to the coupled deployment unit in accordance with other modes of the plurality of operating modes of the conducted electrical weapon. The handle may be configured to provide an activation signal to the coupled deployment unit in accordance with each of a live mode, a simulation mode, and a training mode of the conducted electrical weapon. However, in embodiments according to various aspects of the present disclosure, a power signal may not be provided to the coupled deployment unit and/or one or more input signals may not be received from the coupled deployment unit in accordance with a live mode and/or a training mode of the handle. Alternately or additionally, a stimulus signal may not be provided to the coupled deployment unit in accordance with a simulation mode of the handle.

In various embodiments, processing circuit 350 may cooperate with the indicator of a deployment unit irrespective of a status of a control interface or safety (e.g., control interface 345). For example, processing circuit 350 may determine indicia describing a deployment unit whether control interface 345 is set to "safety mode" or an "armed mode.". In various embodiments, processing circuit 350 may only cooperate with the indicator of a deployment unit when control interface is set to an "armed mode". In various embodiments, processing circuit 350 may only cooperate with the indicator of a deployment unit once control interface 345 is cycled (e.g., switched between a safety mode and an armed mode), or responsive to trigger 340 being activated. In various embodiments, the indicator may be configured to cooperate with processing circuit 350 to cause CEW 300 to operate in a simulation mode. Upon determining that the indicia describe(s) a simulation deployment unit (e.g., as opposed to a live deployment unit and/or training deployment unit) at block 404, execution of method 400 may move to block 406, in which the CEW enters simulation mode 405.

In various embodiments, in simulation mode 405, one or more circuits of the CEW may be powered down. For example, in simulation mode 405, signal generator 370, or one or more capabilities of signal generator 370 may be disabled. In simulation mode 405, signal generator 370 may be incapable of providing an ignition signal and/or a stimulus signal to a communication interface disposed in a bay of the CEW. Signal generator 370 may be prevented from providing an ignition signal and/or a stimulus signal to a deployment unit coupled to the CEW.

In various embodiments, in simulation mode 405, one or more circuits of a CEW may be energized. For example, in simulation mode 405, power may be provided by power supply 360 to communication circuit 375. The power may enable communication circuit 375 to communicate with simulator 4 (e.g., via server 13 and/or simulation processing circuit 6). In simulation mode 405, power may be provided by power supply 360 to motion detector 385, so that motion detector 385 may detect motion of simulation deployment unit 320, and thereby motion of CEW 300. In simulation mode 405 processing circuit 350 may be configured to detect one or more of an activation of a trigger (e.g., trigger 340), motion data provided by a motion detector (e.g., motion detector 385), and operation of a control interface (e.g., control interface 345).

In various embodiments, execution of method 400 may move to block 410, in which a processing circuit of the CEW detects motion data from a motion detector of a simulation deployment unit. Detecting motion from a motion detector may be performed responsive to the CEW entering simulation mode 405. For example, processing circuit 350 of CEW 300 may detect motion data from motion detector 385 of simulation deployment unit 320 in accordance with CEW 300 operating in simulation mode 405. The motion data may correspond with at least one of motion (e.g., change in position, change in orientation, etc.) or an initial orientation of the simulation deployment unit. The processing circuit may additionally detect motion data provided by a motion detector located in handle 310. The motion data may be provided responsive to indicia describing the simulation deployment unit being detected (e.g., block 404) and/or power being provided to the simulation deployment unit. For example, detecting motion data 410 may comprise processing circuit 350 of handle 310 detecting motion data from motion detector 385 with brief reference to FIG. 3. Motion detector 385 may rely on power provided by power supply 360 through communication interface 380 to detect motion data and provide the motion data to processing circuit 350. Processing circuit 350 may sample the one or more motion detectors at regular intervals. For example, a sampling rate of the one or more motion detectors may be in the order of 1 kHz. In embodiments, sampling a motion detector may comprise transmitting a request for motion data from a processor of a handle of a CEW to a motion detector of a simulation deployment unit. Transmitting the request periodically may comprise polling the motion detector. Responsive to the request, the motion data may be received from the simulation deployment unit. The request may be received by a processing circuit of the motion detector. The motion detector may return the motion data responsive to the request. In other embodiments, sampling the motion detector may comprise periodically detecting, by the processing circuit, motion data continuously provided by a motion detector of a simulation deployment unit in communication with the processing circuit. The motion data may be received by the processing unit via a bay of the CEW.

In embodiments, motion detector 385 may comprise a processing circuit configured to generate the motion data. The processing circuit may receive a motion signal from a motion sensor. The motion signal may represent motion detected by the motion sensor. The processing circuit may generate the motion data in accordance with the motion signal. The processing circuit may convert the motion signal from the motion sensor to the motion data. The motion data may comprise digital data. The motion data may identify a motion detected by the motion sensor. For example, motion detector 385 may comprise an IMU communicatively coupled to a processing circuit. The processing circuit may convert a voltage level of a signal received from the IMU into motion data that identifies one or more of a direction in which simulation deployment unit is oriented and/or a position at which simulation deployment unit 320 is physically positioned. For example, the processing circuit may transform a particular voltage into a corresponding angle to which the simulation deployment unit is tilted when the particular voltage is provided. The corresponding angle may be identified in the motion data. The motion data may indicate the corresponding angle to processing circuit 350 upon receipt of the motion data by processing circuit 350.

In various embodiments, processing circuit 350 may perform calculations on the motion data provided by motion detector 385 to determine at least one of a change in position, a change in orientation, or an initial orientation of CEW 300. Processing circuit 350 may determine whether the motion data reported along and/or about the axes corresponds to movement of CEW 300. Processing circuit 350 may use the motion data from motion detector 385 to detect movement in a direction (e.g., along an axis, about an axis, etc.). Processing circuit may perform sensor fusion on motion data provided by two or more motion detectors to improve estimation of position and orientation of a CEW. At least one motion detector of the two or more detectors may be disposed in the deployment unit. For example, a processor may combine a first motion data provided by a first motion detector disposed in simulation deployment unit 320 with a second motion data provided by a second motion detector disposed in handle 310 by applying a sensor fusion algorithm. Alternatively, or additionally, processing circuit 350 may transmit an input signal corresponding with the motion data to a server and/or simulation processing circuit for further processing.

In various embodiments, execution of method 400 may move from block 410 to block 412, in which processing circuit 350 cooperates with communication circuit 375 to transmit a first input signal corresponding with motion data detected by the motion detector to a simulator. The first input signal may comprise motion data from a simulation deployment unit. Alternately or additionally, the first input signal may comprise processed motion data. For example, the first input signal may comprise processed motion data that includes at least one of a change in position, a change in orientation, or an initial orientation calculated by processing circuit 350 of handle 310. The first input signal may be transmitted irrespective of a setting of control interface 345. The first input signal may be transmitted even when control interface 345 is set to a "safety mode". Upon receipt of the first input signal, the simulator may simulate motion of the virtual CEW corresponding with the detected motion of CEW 300 on a display (e.g., display 7) accordingly. The first input signal may be transmitted in accordance with the CEW operating in simulation mode 405.

In various embodiments, execution of method 400 may move to block 420, in which processing circuit 350 detects an activation of trigger 340. The activation may correspond with a depression of the trigger by a user, indicating the user's desire to deploy CEW 300. In some embodiments, detecting the activation trigger may be performed concurrently with other operations including detecting motion data (block 410).

In various embodiments, execution of method 400 may move from block 420 to block 422, in which processing circuit 350 cooperates with communication circuit 375 to transmit a second input signal corresponding with activation of the trigger to a simulator, responsive to detecting activation of the trigger. Upon receipt of the second input signal, the simulator may simulate deployment of the virtual CEW on a display accordingly. In some embodiments, transmitting the second input signal may comprise transmitting operation data of the CEW. The transmitting may be performed concurrently with transmission of other data from the CEW. For example, transmitting the second input signal (block 422) may be performed concurrently with transmitting the first input signal (block 412). For example, communication circuit 375 may transmit a sequence (e.g., stream) of motion data to simulator 4 and the second input signal may also be transmitted during the transmitting of the sequence of motion data. The second input signal may be multiplexed with the stream of motion data to enable concurrent transmission. Accordingly, a same communication circuit integrated with a handle may transmit input signals that are generated by a component integrated with the handle and another component separably coupled to the handle. For example, communication circuit 375 may transmit operation data generated via activation of control interface 345 and/or trigger 340, as well as motion data generated at least in part by motion detector 385 of simulation deployment unit 320 with brief reference to FIG. 3. Further a same communication circuit may be used by which data is transmitted for other operating modes. For example, communication circuit 375 may further be operable to broadcast a notification when trigger 340 is actuated while handle 310 is operated in a live mode. A manner of transmission may be different between different operating modes. For example, communication circuit 375 may broadcast an unaddressed notification in a live mode, such that nearby devices may detect operation of handle 310. In a simulation mode, unicast communication may be provided by communication circuit 375 such that only a simulator paired with handle 310 may receive an input signal comprising motion and/or operation data.

In various embodiments, execution of method 400 may move from block 422 to block 424, in which processing circuit 350 may provide an activation signal to recoil simulator 390 to simulate recoil. The activation signal may be provided responsive to detecting activation of trigger 340. The activation signal may be provided in accordance with the CEW operating in simulation mode 405. Processing circuit 350 may instruct signal generator 370 to transmit an activation signal to recoil simulator 390 via communication interface 380. Timing of the activation signal may correspond with timing of the simulated deployment of the virtual CEW projected on display 7 to improve fidelity of the simulation system. For example, an updated image of virtual CEW 9 representing deployment of a virtual electrode may be synchronized in time with the activation signal being provided to recoil simulator 390. In embodiments, the activation signal may be provided concurrently with transmitting the second input signal (block 422). Accordingly, an input signal received via a control interface of CEW may cause corresponding information to be transmitted to both a remote computing device as well as a local device removably coupled to the CEW.

In various embodiments, CEW 300 may comprise a haptic feedback component that may function as a recoil simulator. For example, CEW 300 may comprise a haptic motor. While in simulation mode 405, responsive to detecting an activation of trigger 340, processing circuit 350 may provide an activation signal to the haptic motor disposed in handle 310 to provide haptic feedback to a user.

In various embodiments, execution of method 400 may move to block 430, in which processing circuit 350 detects an operation of control interface 345. The operation may correspond with setting control interface 345 to a particular mode by a user. In some embodiments, detecting operation of a control interface may be performed concurrently with other operations including detecting motion data (block 410).

In various embodiments, execution of method 400 may move from block 430 to block 432, in which processing circuit 350 cooperates with communication circuit 375 to transmit a third input signal corresponding with operation of the control interface to a simulator, responsive to detecting operation of the control interface. Upon receipt of the third input signal, the simulator may simulate operation of the control interface on the virtual CEW projected on display 7 accordingly. The virtual CEW may perform in a mode corresponding with the operation of the control interface. For example, if control interface 345 is set to a "safety mode", virtual CEW may be unable to fire, regardless of processing circuit 350 detecting an activation of trigger 340. If control interface 345 is set to an "armed mode", firing of the virtual CEW may be enabled, such that activation of trigger 340 (e.g., a subsequent detecting of operation of a trigger, (block 420)) causes the simulator to simulate deployment of the virtual CEW on display 7.

In some embodiments, transmitting the third input signal may comprise transmitting operation data of the CEW. The third input signal may comprise second operation data. The second operation data may be different from first operation data included in a second input signal transmitted in response to detection of operation of a trigger. Unlike an activation signal associated with the second input signal, operation of the control interface may cause a handle of a CEW to communicate with only a remote computing device (e.g., simulator 4, server 13, and/or processing circuit 6), rather than both the remote computing device and a locally, selectively coupled device (e.g., simulation deployment unit 20).

In embodiments, transmitting the third input signal may be performed concurrently with transmission of other data from the CEW. For example, transmitting the second input signal (block 422) may be performed concurrently with transmitting the first input signal (block 412). A communication circuit of the CEW may transmit a sequence of motion data to a simulator and the third input signal may also be transmitted during the transmitting of the sequence of motion data. The third input signal may be multiplexed with the stream of motion data to enable concurrent transmission. For example, second or third input signals may be time multiplexed, frequency multiplexed, included in a same packet payload, or other otherwise transmitted in combination to a remote computing device.

In various embodiments, execution of method 400 may move to block 440, in which processing circuit 350 detects whether simulation deployment unit 320 is absent (e.g., not coupled with handle 310). Detecting the simulation deployment unit to not be present may comprise requesting indicia via a communication interface of a bay of a handle of a CEW and, in accordance with the requesting, receiving no response and/or indicia identifying a type of deployment unit other than a simulation deployment unit. If processing circuit detects an absence of simulation deployment unit 320, execution of method 400 may move to block 450, exiting simulation mode 405. In some cases, an absence of simulation deployment unit 320 may indicate a user is in the process of reloading CEW 300.

In various embodiments, execution of method 400 may only exit simulation mode 405 after processing circuit 350 detects an absence of deployment unit 320 after an elapse of a first predetermined amount of time. For example, the first predetermined amount of time may comprise a duration greater than the average duration it takes for a user to reload a CEW. For example, the first predetermined amount of time may be greater than 5 seconds, greater than 10 seconds, or greater than 30 seconds. When the first predetermined amount of time has elapsed, method 400 may proceed to exit simulation mode 405, corresponding to block 450.

In various embodiments, responsive to not detecting an absence of deployment unit 320 (e.g., detecting a presence of deployment unit 320), execution of method 400 may move to block 460, in which processing circuit 350 detects whether no motion of CEW 300 has occurred after an elapse of a second predetermined amount of time. Detecting that no motion has occurred after an elapse of a second predetermined amount of time may be indicative that the user has completed using CEW 300 in a simulation system. Detecting that no motion has occurred after the elapse of the second predetermined amount of time may indicate that CEW 300 is stationary (e.g., the user has relinquished control of CEW 300). For example, after detecting motion data from motion detector 385 corresponding with no movement of CEW 300 for a second predetermined amount of time, execution of method 400 may move to block 450 and exit simulation mode 405. The second predetermined amount of time may comprise a duration less than 5 minutes, less than 3 minutes, less than 2 minutes, less than 1 minute, less than 30 seconds, or any other finite duration.

In various embodiments, responsive to not detecting that no motion has occurred after the elapse of the second predetermined amount of time, execution of method 400 may move to block 470 and remain in simulation mode 405. Not detecting that no motion has occurred after the elapse of the second predetermined amount of time may indicate the user desires to continue using CEW 300 in simulation mode 405.

In various embodiments, and with specific reference to FIG. 5, a method 500 performed by a simulation deployment unit for a CEW is described. A simulation deployment unit, such as simulation deployment unit 320 may be configured to perform one or more steps of method 500. At block 501, execution of method 500 starts.

In various embodiments, at block 502, deployment unit 320 may engage a provided handle, such as handle 310. Engaging provided handle 310 may include communicably coupling communication interface 380 with handle 310, thereby enabling the transfer of power and/or data between handle 310 and components of deployment unit 320. For example, engaging deployment unit 320 with a provided handle may communicably couple motion detector 385, recoil simulator 390, and or indicator 395 with one or more circuits of provided handle 310. Indicator 395 may cooperate with processing circuit 350 upon engagement of deployment unit 320 with handle 310. Indicator 395 may cooperate with processing circuit 350 for automatic communication of indicia conveying information from indicator 395 to processing circuit 350. Indicator 395 may cooperate with processing circuit 350 to cause CEW 300 to enter a simulation mode (e.g., simulation mode 405).

In various embodiments, responsive to engaging a provided handle, execution of method 500 may move to block 504. At block 504, communication interface 380 may pass power to motion detector 385. Communication interface 380 may pass (e.g., transfer, provide, couple, etc.) power provided by handle 310. The power may be coupled from a power supply external to the simulation deployment unit. For example, the power may be provided from one or more of power supply 360, processing circuit 350, or signal generator 370 to motion detector 385. Motion detector 385 may require power to detect motion. Until such power is provided, motion detector 385 may be unable to detect motion of the simulation deployment unit. Absent power being received via communication interface 380, the simulation deployment unit may refrain, prevent, or otherwise not output motion data via the communication interface 380. Deployment unit 320 may require power from handle 310 to detect motion. Motion detector 385 may receive power from communication interface 380. The power may be provided by a provided handle. In embodiments, the simulation deployment unit may be configured to receive power continuously via the communication interface. Responsive to the received power, one or more components of the simulation deployment unit may be activated and functional to perform a subsequent operation.

In various embodiments, responsive to deployment unit 320 engaging 502 a provided handle and/or communication interface 380 passing 504 power to motion detector 385, execution of method 500 may move to block 506. At block 506, motion detector 385 may be configured to detect motion data. The motion data may correspond with motion and or an initial orientation of deployment unit 320. The motion data may identify the motion and/or orientation of simulation deployment unit 320. Motion detector 385 may be configured to pass motion data through communication interface 380. Motion data may be passed through communication interface 380 to a processing circuit of a provided handle, such as processing circuit 350 of handle 310, for processing. Alternately or additionally, motion data may be passed through communication interface to communication circuit 375 for transmission to one or more components of a simulator for processing, such as server 13 and/or simulation processing circuit 6 of simulator 4. Responsive to passing 504 the power, the motion data may be provided (e.g., passed 506) continuously to a provided handle to which the simulation deployment unit is coupled.

In various embodiments, execution of method 500 may move to block 506. At block 506, communication interface 380 may pass an activation signal to recoil simulator 390. The activation signal may cause recoil simulator 390 to simulate recoil. The activation signal may be provided by a processing circuit and/or signal generator of a provided handle, such as processing circuit 350 and/or signal generator 370. The activation signal may be provided responsive to an activation of trigger 340 of handle 310. The activation signal may be provided after the power is passed to the simulation deployment unit. In embodiments, passing the activation signal 506 and/or simulating the recoil at block 508 may be performed responsive to passing power 504. The recoil simulator may cause the recoil to be simulated in accordance with both the passed power and the passed activation signal. In embodiments, a sequence of activation signals may be received by the simulation deployment unit. Responsive to each activation signal, the recoil simulator may be activated to simulate recoil.

In embodiments, the recoil simulator may comprise a threshold number of recoil simulations. A reference number of recoil simulations may be reset each time the simulation deployment unit is engaged 502. The reference number may be incremented in response to each activation signal received 506. The reference number may be incremented while the simulation deployment unit remains engaged with the provided handle. After the reference number is greater than the threshold number, each activation signal received may not cause a recoil to be simulated. Such an arrangement may enable simulated deployment of a predetermined number of electrodes associated with a deployment unit (e.g., two, three, five, ten or more). Once the deployment unit is re-engaged or disengaged with the provided handle, the reference number may be reset, enabling the simulation deployment unit to represent a fully undeployed (e.g., new, unconsumed, unused, etc.) deployment unit. In other embodiments, a threshold number and reference number may be tracked by other circuits, including a processing circuit of a handle. In such embodiments, activation signals may no longer be provided by the handle responsive to the threshold number being exceeded. The processing circuit of the handle may preclude activation signals from being received 506 responsive to a reference number of activation signals exceeding a threshold number.

In various embodiments, execution of method 500 may move to block 508. At block 508, deployment unit 320 may disengage a provided handle. Upon disengagement form a provided handle, one or more components of deployment unit 320 may be disabled. For example, motion detector 385 and recoil simulator 390 may be disabled responsive to disengagement of deployment unit 320 from handle 310. Deployment unit 320 may be disengaged from a provided handle responsive to a user desiring to reload the provided handle. Deployment unit 320 may be disengaged from a provided handle responsive to a user terminating use of a simulation system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A conducted electrical weapon comprising:
   a simulation deployment unit comprising a motion detector and a communication interface, the communication interface communicably coupled with the motion detector; and
   a handle separable from the simulation deployment unit, the handle comprising:
      a communication circuit;
      a processing circuit communicably coupled to the communication circuit, the processing circuit communicably couplable with the motion detector of the simulation deployment unit by the communication interface of the simulation deployment unit; and
      a non-transitory computer readable medium having software instructions stored thereon that, when executed by the processing circuit, cause the processing circuit to perform operations comprising:
         while operating in a simulation mode:
            detecting, via the motion detector of the simulation deployment unit, motion data corresponding with at least one of motion or an initial orientation of the conducted electrical weapon; and
            transmitting, via the communication circuit, a first input signal corresponding with the motion data to a provided simulator to track the at least one of the motion or the initial orientation of the conducted electrical weapon in a simulated environment.

2. The conducted electrical weapon of claim 1 wherein the operations further comprise:
   while operating in the simulation mode:
      detecting, via the motion detector, motion data corresponding with the motion of the conducted electrical weapon, wherein the motion comprises at least one of a change in position of the conducted electrical weapon or a change in orientation of the conducted electrical weapon.

3. The conducted electrical weapon of claim 1 wherein the simulation deployment unit comprises an indicator, and wherein the operations further comprise:
   cooperating with the indicator of the simulation deployment unit to determine indicia describing the simulation deployment unit; and
   responsive to cooperating with the indicator, entering the simulation mode.

4. The conducted electrical weapon of claim 1 wherein the handle comprises a control interface, and wherein the operations further comprise:
   while operating in the simulation mode, remaining in the simulation mode irrespective of an operation of the control interface.

5. The conducted electrical weapon of claim 4 wherein the control interface comprises a safety switch, and wherein the operations further comprise:
   while operating in the simulation mode, remaining in the simulation mode irrespective of a position of the safety switch.

6. The conducted electrical weapon of claim 1 wherein the operations further comprise:
   while operating in the simulation mode, responsive to detecting at least one of an absence of the simulation deployment unit or an elapse of a predetermined amount of time, exiting the simulation mode.

7. The conducted electrical weapon of claim 1 wherein the operations further comprise:
   while operating in the simulation mode, disabling one or more circuits of the conducted electrical weapon.

8. The conducted electrical weapon of claim 1 wherein the operations further comprise:
   while operating in the simulation mode, providing power to the motion detector of the simulation deployment unit via the communication interface.

9. The conducted electrical weapon of claim 1 wherein the handle comprises a power supply, and wherein the motion detector of the simulation deployment unit relies on power from the power supply of the handle to detect the motion data.

10. The conducted electrical weapon of claim 1 wherein the simulation deployment unit comprises an inert deployment unit.

11. The conducted electrical weapon of claim 1 wherein the handle comprises a trigger communicably coupled with the processing circuit, and wherein the operations further comprise responsive to detecting an activation of the trigger, transmitting a second input signal corresponding with the activation of the trigger to the provided simulator.

12. The conducted electrical weapon of claim 11 comprising a recoil simulator, wherein the operations further comprise responsive to detecting the activation of the trigger, transmitting an activation signal to the recoil simulator to cause the recoil simulator to simulate recoil.

13. The conducted electrical weapon of claim 12 wherein the recoil simulator is disposed in the simulation deployment unit, and wherein the recoil simulator is communicably coupled to the processing circuit of the handle via the communication interface of the simulation deployment unit.

14. The conducted electrical weapon of claim 12 wherein the recoil simulator comprises one of a solenoid, a pneumatic actuator, and a motor.

15. A simulation deployment unit comprising:
a housing,
a motion detector disposed within the housing, and
a communication interface coupled to the housing and communicably coupled with the motion detector; wherein:
the communication interface is configured to pass power to the motion detector;
during a simulation mode and responsive to the power, the motion detector is configured to detect motion of the simulation deployment unit associated with at least one of a change in position, a change in orientation, or an initial orientation of the simulation deployment unit; and
during the simulation mode and responsive to the motion being detected, the motion detector is configured to transmit motion data through the communication interface to a communication circuit housed in a handle of a conducted electrical weapon, wherein the motion data indicates the at least one of the change in position, the change in orientation, or the initial orientation of the simulation deployment unit.

16. The simulation deployment unit of claim 15 wherein the motion detector generates the motion data using the power passed by the communication interface.

17. The simulation deployment unit of claim 15 wherein the simulation deployment unit comprises at least one of an inert deployment unit or a non-consumable deployment unit.

18. The simulation deployment unit of claim 15 wherein the motion detector comprises at least one of an accelerometer, a gyroscope, or a magnetometer.

19. The simulation deployment unit of claim 15 comprising a recoil simulator communicably coupled to the communication interface, wherein:
the communication interface is configured to pass an activation signal to the recoil simulator; and
responsive to the activation signal, the recoil simulator simulates recoil.

20. The simulation deployment unit of claim 19 wherein the recoil simulator comprises an electromechanical solenoid including a coil and an armature.

* * * * *